US009622026B2

(12) United States Patent
Yu et al.

(10) Patent No.: US 9,622,026 B2
(45) Date of Patent: Apr. 11, 2017

(54) METHOD, SYSTEM AND DEVICE OF LOCATION AUTHENTICATION

(71) Applicant: TWINKLING STARS TECHNOLOGY LIMITED, Hong Kong (CN)

(72) Inventors: Wing-Fung Yu, Hong Kong (CN); Jason Felix Tsz-Kiu Chiu, Hong Kong (CN)

(73) Assignee: STARBERRY LIMITED, Hong Kong (CN)

( * ) Notice: Subject to any disclaimer, the term of this patent is extended or adjusted under 35 U.S.C. 154(b) by 0 days.

(21) Appl. No.: 13/872,959

(22) Filed: Apr. 29, 2013

(65) Prior Publication Data

US 2013/0288706 A1    Oct. 31, 2013

(30) Foreign Application Priority Data

Apr. 27, 2012 (CN) .......................... 2012 1 0129060

(51) Int. Cl.
*H04W 4/02* (2009.01)
*H04W 4/04* (2009.01)
*H04L 29/08* (2006.01)

(52) U.S. Cl.
CPC ............... *H04W 4/02* (2013.01); *H04L 67/18* (2013.01); *H04W 4/043* (2013.01)

(58) Field of Classification Search
CPC ....... H04W 4/02; H04W 12/06; H04W 48/04; H04W 4/001; H04W 4/023; H04W 64/003;
(Continued)

(56) References Cited

U.S. PATENT DOCUMENTS 7,772,976 B2 * 8/2010 Christopher ............... 340/572.1
8,224,351 B1 7/2012 Sushkov et al.
(Continued)

FOREIGN PATENT DOCUMENTS

CN    101562778 A    10/2009
CN    101583075 A    11/2009
(Continued)

OTHER PUBLICATIONS

English Language Abstract of Publication No. TW200912356A; Publication Date of Corresponding Patent Application: Mar. 16, 2009; Applicant: Inventec Corp; Title: A position detecting system and method for an electronic device ; Published by: European Patent Office; URL: http://worldwide.espacenet.com/publicationDetails/biblio?11=3&ND=3&adjacent=true&locale=en_EP&FT=D&date=20090316&CC=TW&NR=200912356A&KC=A.
(Continued)

*Primary Examiner* — George Eng
*Assistant Examiner* — Umair Ahsan
(74) *Attorney, Agent, or Firm* — David Lewis; Bowen Liu; Jennifer A. Haynes

(57) ABSTRACT

The present invention relates to a field of communication technology that provides a method, system and device of location authentication. The method comprises the following steps: the mobile device receives the signal marking the position information of the location base station sent by the location base station within the same region. The mobile device would obtain the position information of the location base station after analyzing the signal; the location base station would send the position information to the location authentication server to obtain the location authentication that it is in the same region with the location base station. Thus, this invention performs the location authentication of
(Continued)

the mobile device staying in the same region with the location base station.

39 Claims, 11 Drawing Sheets

(58) Field of Classification Search
CPC ............... H04L 67/18; H04M 1/72572; G06F 2221/2111; G06Q 30/0261; H04B 11/00; H04B 17/0072
USPC ....... 455/456.1–457; 367/2, 6; 701/516–517; 726/2–4, 21, 27–29; 705/14.57–14.58
See application file for complete search history.

(56) References Cited

U.S. PATENT DOCUMENTS

| | | | |
|---|---|---|---|
| 8,229,465 | B2 | 7/2012 | Rekimoto |
| 8,867,313 | B1 | 10/2014 | Rivlin et al. |
| 2003/0065805 | A1* | 4/2003 | Barnes, Jr. ................. 709/231 |
| 2005/0035862 | A1 | 2/2005 | Wildman et al. |
| 2005/0196131 | A1* | 9/2005 | Narusawa ............... G10H 1/46 386/241 |
| 2007/0112942 | A1 | 5/2007 | Moquin et al. |
| 2008/0042844 | A1 | 2/2008 | Christopher |
| 2009/0231104 | A1 | 9/2009 | Kofman et al. |
| 2010/0049452 | A1* | 2/2010 | Suginouchi et al. ........... 702/56 |
| 2010/0109864 | A1 | 5/2010 | Haartsen et al. |
| 2010/0228602 | A1 | 9/2010 | Gilvar et al. |
| 2011/0028160 | A1* | 2/2011 | Roeding et al. ........... 455/456.1 |
| 2011/0043373 | A1* | 2/2011 | Best et al. ................ 340/825.49 |
| 2012/0025976 | A1 | 2/2012 | Richey et al. |
| 2013/0281114 | A1 | 10/2013 | Yu et al. |
| 2013/0282438 | A1* | 10/2013 | Hunter et al. ................ 705/7.32 |
| 2014/0032346 | A1* | 1/2014 | Hong et al. ..................... 705/18 |
| 2014/0141805 | A1* | 5/2014 | Mirov ........................ 455/456.3 |
| 2014/0171110 | A1* | 6/2014 | Rekimoto .................. 455/456.1 |

FOREIGN PATENT DOCUMENTS

| | | |
|---|---|---|
| CN | 101860786 A | 10/2010 |
| CN | 101983515 A | 3/2011 |
| CN | 102105809 A | 6/2011 |
| CN | 201887780 U | 6/2011 |
| CN | 102124367 A | 7/2011 |
| CN | 102164405 A | 8/2011 |
| CN | 103249140 A | 8/2013 |
| TW | 200912356 A | 3/2009 |
| WO | WO 2011/014292 A1 | 2/2011 |

OTHER PUBLICATIONS

C1—Search Report for Chinese patent application No. CN201210030372.X (having publication No. CN103249140A).
C2—Search Report for Chinese patent application No. CN201210129060.4.

* cited by examiner

METHOD, SYSTEM AND DEVICE OF LOCATION AUTHENTICATION

RELATED APPLICATIONS

This application claims priority benefit of Chinese patent, Serial Number, CN 201210129060.4, by YU, Wing Fung (余詠峰) and CHIU, Tsz Kiu Jason Felix (趙子翹), entitled, "A METHOD, SYSTEM AND DEVICE OF LOCATION AUTHENTICATION" 終端權限認証 定位的方法 系統及裝置), filed Apr. 27, 2012, which is incorporated herein by reference.

FIELD OF THE INVENTION

This specification relates to the field of communication technology.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

With the development of communication technology, communication terminals are used in various applications, which include navigations, position trigger social networks, position based commercials and products and services search. Most of these services utilize technologies, such as GPS (Global Positioning System) or AGPS (Assisted GPS), to identify the current position of the communication terminal and hence the user using the communication terminal. The technologies that identify the current position provide a reasonable accuracy of the position of the user while the user is in the outdoor environments. However, the signals used to locate the user would be severely interfered and blocked when the communication terminals are held indoors, which may cause a failure to confirm the positions of communication terminals precisely. Further, other communication technologies could be used to obtain the current position of the communication terminal.

However, for indoor or outdoor environments surrounded by buildings, GPS usually fails to provide a precise positioning, because the satellite signal is weak. The buildings affect the satellite signal of the GPS. Moreover, communication terminals may receive fewer than three satellite signals when there are many buildings crowded around the communication terminal. In this case, GPS is unable to offer a favorable positioning signal. Therefore, if user is indoors or between many buildings, GPS would fail to provide the relevant information about the terminal position to determine a the terminals position or to accurately determine the terminals position.

Triangulation of Wi-Fi (Wireless Broadband) signals provides a competitive technology of indoor positioning. Wi-Fi signals are effective under normal circumstances, and the installations of new devices may not be required for receiving the signals. On the other hand, Wi-Fi signals can make positioning mistakes as a result of the Wi-Fi signals traveling through walls. Moreover, the Wi-Fi signal strength is a part of the iOS (formerly iPhone OS, the handheld operating system developed by the Apple Inc.) private API (Application Programming Interface), which prevent iPhones from using their Wi-Fi to determine the position of the iPhone. So, the effect is not ideal. Also Wi-Fi fails to perform location authentication of mobile device within the same region as the fixed device of the present invention.

To sum up, the present location authentication within the same region has inconvenience and defects. Thus, improvements may be desirable.

SUMMARY OF THE INVENTION

This specification relates to a method, system and device of location authentication. To overcome the above-mentioned defects, a method and system is provided for device of location authentication to perform location authentication of a mobile device residing in the same region as the location base station of the location authentication system. Throughout this specification the terms location base station and sending end may be substituted one for another to obtain different embodiments. Similarly, the terms receiving end and mobile device may be substituted one for another to obtain different embodiments.

In an embodiment, one or more locations base stations are located in one or more regions. In an embodiment, each region may only have one base station or a group of base stations that send a particular code representing that region. Each region may have a different base station or a different group of base stations. A mobile device receives the signal, allowing the mobile device to identify where the mobile device is located, and then the mobile device returns a location signal to the base station or group of base stations, which allows the base station or group of base stations to determine that the mobile device is present in that region. In the case where there is only one base station per region and a different base station is located in each region, the same code may be used to identify the base station and the region. Alternatively, the base station may send a code identifying the region and another code identifying the location base station. Accordingly, in this specification references to codes representing the location base station and the region (or room or location) may be substituted one for another throughout this specification.

In an embodiment, a non-audible signal is used for determining the position of a mobile device. By the definition, in this patent application, the non-audible range is 25 Hz or less and 17000 Hz or more, and in an embodiment, the frequencies used for the sound signal are 16 Hz-25 Hz and 17000-22000 Hz. Since the non-audible sounds may include low frequencies that are 25 Hz or less and other frequencies that are not usually considered ultrasound, the specification uses the term non-audible signals instead of ultra-sound (ultra-sound normally refers to non-audible sound in the higher frequency range, such as around and beyond 20,000 Hz). Nonetheless, in this specification, ultra sound may be substituted for non-audible to obtain specific embodiments.

The location base station and the mobile device are not required to communicate via non-audible sound waves either direction of communication, but another form of communication may be used instead for either or both directions of communication. For example, the mobile device is not required to have a speaker for sending the non-audible sound waves and the base station is not required to have a micro-phone to listen to the mobile device. The ultrasound (or other non-audible sound) communication may be a one-way communication from the location base station to the mobile device. The other direction of communication may be another form of communication, such as via electromagnetic waves (e.g., radio waves, microwaves, infrared waves, optical waves) or another form of communication (alternatively, the other direction of communication may also be via non-audible sound waves).

The idea of 'silence' is another concept used in at least some embodiments disclosed in this specification, for example, in relationship to the concept of synchronized data transmission. Specifically, using the concept of sending a series of 0's and 1's and sending one bit in a particular fixed period (e.g., one bit per second), using 'silence' (or another fixed frequency) to represent zeros while using another fixed frequency (e.g., 22,000 Hz) to represent 1's. The term "silence" refers to the electronic device not picking up a signal, and does not refer to whether or not the human ear will hear the signal. Although, as an example, through this specification, a low value is used to represent a '0' and a high value is used to represent a '1', other embodiments may be obtained by using the high value to represent a '0' and a low value to represent a '1'.

Authentication may be accomplished by sending values representing the location of the base station that are not static (that is values that are changed every so often). In a one embodiment, each location has a static value representing a room (or other region) into which the base stations sends a particular signal, but another value is substituted for the static value, which is revised every so often. For example, a random number generator generates the substitute value for the value representing the room, and each day, a new random number is generated and substituted for the previous random number. An authentication server matches the location value received by the location base station from the mobile device with the current location value to check that the location value is current. If the location value is not current something is wrong, and no service information is sent to the mobile device that was not authenticated (the service information may be any information that the owners of the regions—that are being serviced by the system—would like to convey). In other words, the location identification is time sensitive. If the mobile device uses an 'old' location identification and tries to send a message indicating that the mobile device is now in a particular room, after the authentication fails, the location base stations rejects the information sent by the mobile device and do not send any service information.

For example, a security guard may have recorded the position information of a room yesterday. Today, the guard may modify the mobile phone and send the same location information to the central system saying that the guard is patrolling every room (using yesterday's location information) even though the guard is not present. The authentication procedure will detect that something is not right, because the authentication information will not be authenticated.

Some examples of service information are promotional messages (advertisement of a store located in the region of the base station), passwords that employees may need to enter a facility, or messages that an employer may want to convey to employees upon arriving at work or later during the day.

In an embodiment, to locate and authenticate a mobile device, a method of location authentication is provided having steps in accordance with the method that comprises:

the mobile device receives a signal having position information of a location base station sent by the location base station within the same region;

the mobile device obtains the position information of the location base station by at least analyzing the signal;

the mobile device sends the position information to a location authentication server to obtain a location authentication, authenticating that the mobile device is in the same region with the location base station.

In accordance with the method as set forth above, in an embodiment, the step after the location base station sent the position information to the location authentication server to obtain the location authentication that the mobile device is in the same region with the location base station, comprises:

the mobile device obtains service information provided by the location base station.

In accordance with the method as set forth above, in an embodiment, the signals sent by the location base station marking the position information of the location base station are non-audible sound signals;

the same region means within an effective range of the sound signals sent by the location base station. In this specification, where ever the term "marking" is used the words "providing" or "including" may be substituted to obtain other embodiments.

In this specification, although the hearing range of individual people may vary greatly, non-audible sounds are defined as any sound that is 25 Hz or less and any sound that is 17,000 Hz or more.

In accordance with the method as set forth above, in an embodiment, the same region is indoors or outdoors near one or more buildings or in building-intensive environment (e.g., in which GPS signals cannot be relied upon for giving accurate position information);

the location base station is a location base station installed in the same region as the mobile device;

the mobile device is a mobile phone or other mobile terminal. A building intensive area (or a structure intensive area) is an area in which there are so many structures that GPS cannot be relied upon. Any of the outdoor areas mentioned in this specification (or indoor areas), in at least one embodiment, may be any area that has enough structures or other elements or properties that shield out, or interfere with, GPS signals that GPS cannot be relied upon or any other area in which GPS cannot be relied upon.

In accordance with the method as set forth above, in an embodiment, the mobile device receives the signal marking the position information of the location base station sent by the location base station within the same region, the non-audible sound signal is sent at a predefined first frequency; or the non-audible sound signals are sent at a first set of frequencies corresponding to a predefined first set of multi-bit information; or the non-audible sound signal is sent in an alternating sequence (which alternates between sending a signal and not sending a signal) in which a predefined second set of frequencies is sent (e.g., for a predetermined duration of time), then no signal is sent for a predetermined duration to time, and then a third set of frequencies is sent (e.g., for a predetermined duration of time) (the predetermined durations of time may have the same or different lengths), the non-audible sound signal corresponds to the second set of multi-bit information; or the non-audible sound signal is sent by the third set of frequencies corresponding to the third set of multi-bit information generated randomly; the same region is a suite or a room indoors and/or several areas between many buildings outdoors (e.g., a region which does not receive reliable GPS signals).

In accordance with the method as set forth above, in an embodiment, the first frequency corresponds to a predefined first position coding, the first position coding marks and/or includes the position information within the same region;

the first set of multi-bit information corresponds to the predefined second position coding, the second position coding marks and/or includes the position information within the same region;

the second set of multi-bit information corresponds to the predefined third position coding, the third position coding marks and/or includes the position information within the same region;

the third set of multi-bit information corresponds to the predefined fourth position coding, the fourth position coding marks and/or includes the position information within the same region.

In accordance with the method as set forth above, in an embodiment, the first position coding, the first set of multi-bit information, the second set of multi-bit information, and the third set of multi-bit information correspond to one unit of position information in the predefined query table of position information, respectively;

after the mobile device analyzes the signal, in the steps of obtaining the position information of the location base station, the mobile device obtains the position information of the location base station, via decoding the first set of frequencies, the non-audible sound signal being sent in an alternating sequence (which alternates between sending a signal and not sending a signal) in which the predefined second set of frequencies is sent for a predetermined period of time, then no signal is sent for a predetermined duration of time, and then a third set of frequencies is sent for a predetermined duration of time (the predetermined periods of time may each have the same length of time or may be of different lengths of time), obtaining a first set of multi-bit information, the second set of multi-bit information and the third set of multi-bit information by the third frequency, and inquiring the position information corresponding to the first position coding, the second position coding, the third position coding, the fourth position coding in the query table of position information by the mobile device respectively.

In accordance with the method as set forth above, in an embodiment, the query table of position information is stored in the mobile device; or the location base station; or the location authentication server; the ranges of first frequency and first set of frequencies are 17000 Hz-22000 Hz and/or 16 Hz-25 Hz.

In accordance with the method as set forth above, in an embodiment, in the steps of the mobile device sending the position information to the location authentication server to obtain the location authentication of the same region with the location base station, the location authentication server is installed in the location base station, the location base station verifies whether the mobile device is in the same region as the base station, via the position information sent by the mobile device; or the location authentication server is at least one of the servers of the location base station, the server verifies whether the mobile device is in the same region with the location base station via the position information sent by the location base station.

In accordance with the method as set forth above, in an embodiment, the location authentication server comprises more than one location authentication servers, the one or more of the location authentication servers are installed in one or more location base stations; the location authentication servers comprises at least one main server and at least one synchronization server; the synchronization server synchronizes the query table of position information with the main server according to the predefined second time interval.

In accordance with the method as set forth above, in an embodiment, the location authentication server or the location authentication server installed in a location base station generates the third set of multi-bit information generated randomly;

after the server randomly generates the third set of multi-bit information, the server transmits the third set of multi-bit information to the location base station.

In accordance with the method as set forth above, in an embodiment, there is more than one location base station, more than one third set of multi-bit information, the more than one third set of multi-bit information corresponds to the more than one location base station, respectively.

In accordance with the method as set forth above, in an embodiment, the several pieces of third set of multi-bit information regenerate a new set of the third set of multi-bit information randomly spaced by the first time interval.

In accordance with the method as set forth above, in an embodiment, the steps of the mobile device obtaining the service information provided by the location base station comprise:

the location base station records the information of the mobile device within the same region; or the location base station sends promotion information to the mobile device; or the location base station sends security information of same region to the mobile device.

In accordance with the method as set forth above, in an embodiment, the location base station is a device having a fixed location installed in the same region;

the mobile device is a mobile terminal or mobile phone.

In accordance with the method as set forth above, in an embodiment, there are several location base stations within the same region;

the steps of the mobile device receiving the signal marking the position information of location base station sent by the location base station, comprise:

the location base station sends the signals marking the position information of the location base stations, respectively;

the mobile device receives the signals sent by the location base stations that the signals are above or equal to the predefined signal strength.

In accordance with the method as set forth above, in an embodiment, the predefined signal strength is dynamically set to double of the mean signal strength of signals received by the mobile device in the predefined period;

in steps of the mobile device receiving signals sent by the location base stations more than one location base station has signal strength above or equal to the predefined signal strength, the mobile device receives the first signal from a location base station meeting the predefined signal strength;

the mobile device receives the first signal meeting the predefined signal strength; or when there is no location base station that has a signal strength above or equal to the predefined strength, the mobile device receives the first transmitted signal sent by a location base station.

In accordance with the method as set forth above, in an embodiment, the signals marking the position information of location base station sent by the location base stations, respectively, are signals with same or different frequency.

A system of location authentication is provided in which the system comprises:

a first signal transmitting-receiving module, which is installed in the location base station, that sends a signal, including position information of a location base station, to a mobile device within the same region;

a second signal transmitting-receiving module, which is installed in the mobile device, that receives the signal including the position information of the location base station sent by the first signal transmitting-receiving module, and sending the position information of the location base station to a position message validation module after the second signal transmitting-receiving module (which is in the mobile device) obtained the position information of the location base station;

the position information obtaining module, which is installed in the mobile device, analyzes the signal, and obtains the position information of the location base station;

a position message validation module is in the location authentication server that performs location authentication to determine whether the location base station is in the same region with the mobile device.

To elaborate, a hacker may have various means to fool the location base station or mobile device, and the hacker may cause the mobile device to send information indicating that the mobile device is in certain location (even though the mobile device is not actual at that location). To guard against a mobile device being incorrectly identified as being in a location, the mobile device and/or the location base stations sends the position information of the mobile device to the authentication server. As mentioned above, the communications sent from the mobile device back to the location base station (or to the authentication server) may be an electro-magnetic signal rather than a the sound wave communication. If the mobile device is not in the location to receive the location information, via a sound signal, then the mobile device cannot send the current position information that includes the time-sensitive random numbers, and the authentication would fail the authentication. Consequently, the position information is received by the mobile device is sent back to the location base station and/or the authentication server to perform the authentication.

In accordance with the system as set forth above, in an embodiment, the system also comprises:

a service information module in the location base station that provides service information to the mobile device after the position message validation module verifies the mobile device is in the same region with the location base station.

In accordance with the system as set forth above, in an embodiment, the signal including the position information of the location base station sent by the location base station is a non-audible sound signal;

the same region means being within the effective range of signals sent by the location base station.

In accordance with the system as set forth above, in an embodiment, the same region is indoors or near a building-intensive outdoor environment (e.g., in where reliable GPS signals do not reach);

the location base station is a location base station set in the same region;

the mobile device is a mobile terminal or mobile phone.

In accordance with the system as set forth above, in an embodiment, the first signal transmitting-receiving module comprises:

a first control sub-module that controls the first sound frequency generating-transmitting sub-module to generate the predefined first frequency; or determines a correspondence of the first set of multi-bit information to the first set of frequencies; or determines a correspondence of the non-audible sound signal, which is sent in an alternating fashion (alternating between period of time in which a signal is sent and periods of time in which no signal is sent), in which a predefined second set of frequencies is sent for a predetermined period of time, then no signal is sent for a predetermined period of time, and then a third set of frequencies is sent for a predetermined period of time, to the second set of multi-bit information (optionally, the predetermined periods of time are all of the same lengths or of different lengths); or determines the correspondence of the third set of multi-bit information generated randomly to the third set of frequencies; or the first sound frequency generating-and-transmitting sub-module, generates the first frequency according to the control of a first control sub-module, and sends the non-audible sound signal by the predefined first frequency; or generating the first set of frequencies, and sending the first set of frequencies; or spacing the predefined second frequency and third frequency corresponding to the second set of multi-bit information by the first time interval, and sending, in an alternating fashion (in which the signal alternates between periods in which a signal is sent and periods in which no signals is sent), the second set frequencies for a predetermined period of time, then no signal for a predetermined period of time, and the third set frequencies for a predetermined period of time (the predetermined periods of time may be the same or different); or generating the third set of frequency, and sending the non-audible sound signal by the third set of frequencies;

the same region is a suite or a room indoors and/or one or more areas between many buildings in outdoors.

In accordance with the system as set forth above, in an embodiment, the first frequency corresponds to the predefined first position coding, the first position coding marks and/or includes the position information within the same region;

the first set of multi-bit information corresponds to the predefined second position coding, the second position coding marks and/or includes the position coding within the same region;

the second set of multi-bit information corresponds to the predefined third position coding, the third position coding marks and/or includes the position coding within the same region;

the third set of multi-bit information corresponds to the predefined fourth position coding, the fourth position coding marks and/or includes the position coding within the same region.

In accordance with the system as set forth above, in an embodiment, the first position coding, the second position coding, the third position coding and the fourth position coding correspond to one unit of position information in the predefined query table of position information, respectively;

the position information obtaining module comprises:

a decoding sub-module that decodes the first set of frequencies, the non-audible sound signal optionally sent by the predefined second frequency and third frequency being spaced by a first time interval; and obtaining a first set of multi-bit information, a second set of multi-bit information and a third set of multi-bit information by the third set of frequencies, respectively; and a query sub-module that queries the position information corresponding to the first position coding, the second position coding, the third position coding, and the fourth position coding to obtain the position information of location base station.

In accordance with the system as set forth above, in an embodiment, the system also comprises a storing module that stores the query table of position information, and the storing module being installed in the mobile device; or
the location base station; or
the location authentication server;
the ranges of the first frequency and the first set of frequencies are 17000 Hz-22000 Hz and/or 16 Hz-25 Hz.

In accordance with the system as set forth above, in an embodiment, the position message validation module is installed in at least one of the servers of the location base station or in the location base station, the position message validation module verifies whether the mobile device is in the same region with the location base station, via the position information sent by the second signal transmitting-receiving module.

In accordance with the system as set forth above, in an embodiment, the system also comprises several synchronization modules that are installed in several servers of location base stations, respectively; the servers comprise at least one main server and at least one synchronization server;
the synchronization module of the synchronization server synchronizes the query table of position information by the predefined second time interval with the synchronization module of main server.

In accordance with the system as set forth above, in an embodiment, the system also comprises:
a random number generating module (e.g., a random number generator), which is installed in the location authentication server or the location base station, which generates the third set of multi-bit information randomly;
a random number transmitting module, which is installed in the server, which transmits the third set of multi-bit information to the first signal transmitting-receiving module after the random number generating module is installed in the server, the third set of multi-bit information being randomly generated.

In accordance with the system as set forth above, in an embodiment, the random number generating module, which is installed in the main server, randomly generates several pieces of a third set of multi-bit information, the several pieces of third set of multi-bit information correspond to several location base stations, respectively.

In accordance with the system as set forth above, in an embodiment, the several pieces of third set of multi-bit information are regenerated with time spacing intervals of the third time interval.

In accordance with the system, as set forth above, in an embodiment, the service information module comprises:
a recording sub-module that records the information of mobile device within the same region; or
a transmitting sub-module that
sends promotion information to the mobile device; or
sends the security information of same region to the mobile device.

In accordance with the system as set forth above, in an embodiment, there are several location base stations within the same region, the first signal transmitting-receiving modules of location base stations, that are within the same region, send the signal marking and/or including the position information of the location base station, respectively;

the mobile device also comprises:
a signal processing module that filters the signals that are below the predefined strength standard (e.g., a threshold) sent by the location base stations;
a predefined strength standard setting module that
calculates the mean signal strength, the mean signal strength being the mean of the signals received in the predefined period of time, and
sets the predefined signal strength according to the mean signal strength.

The second signal transmitting-receiving module receives the signals that are above or equal to the predefined signal strength filtered by the signal processing module.

In accordance with the system, as set forth above, in an embodiment, the predefined signal strength, which is set by the strength standard setting module, is the double of the mean signal strength or above of the strength of the signals received by the mobile device in the predefined period;
the second signal transmitting-receiving module receives the first signal, the first signal meeting the predefined signal strength.

In accordance with the system, as set forth above, in an embodiment,
the signals marking and/or including the position information of the location base station sent by the location base stations, respectively, are the same frequency or different frequencies; or
when the signals that are sent by the first signal transmitting-receiving modules of the location base stations are below the predefined strength standard, the second signal transmitting-receiving modules of mobile devices receive the first transmitted signal sent by the location base stations.

In accordance with any of the systems as set forth above, in an embodiment, the system comprises several mobile devices and several location base stations, the location base stations are respectively installed in different regions.

In an embodiment, the system includes at least one ore more mobile devices.

In an embodiment, the system includes at least one or more location base stations.

In an embodiment, the system includes at least of one or more location authentication servers.

In an embodiment, the location base station is installed in one or more of several specific regions indoors and/or near the building-intensive outdoor environments, such as in a suite or a room or one or more of several areas between buildings, the location base station sends signals according to a predefined frequency or a predefined set of frequencies. After the mobile device, that is in the same region as the location base station, receives the signal, the mobile device obtains the position information of the location base station and sends the position information to the location authentication server to obtain the location authentication of being in the same region with the location base station. Furthermore, the mobile device obtains the service information provided by the location base station within the same region. The position information of the location base stations provided by this specification corresponds to the multi-bit information, the corresponding multi-bit information controls the location base station sending related frequency signals, the related frequency signals then enhance the security and accuracy of location authentication. The multi-bit information may be generated randomly. In an embodiment, the multi-bit information optimizes the security and suitability of location authentication.

Any of the above embodiments may be used alone or together with one another in any combination. Inventions encompassed within this specification may also include embodiments that are only partially mentioned or alluded to or are not mentioned or alluded to at all in this brief summary or in the abstract.

BRIEF DESCRIPTION OF THE DRAWING

In the following drawings like reference numbers are used to refer to like elements. Although the following figures depict various examples of the invention, the invention is not limited to the examples depicted in the figures.

DETAILED DESCRIPTION OF THE INVENTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

To further understand the objective, technologies and advantages of this invention, followings are the drawings and embodiments to further explain this invention. It should be understood that the embodiments are for the illustrations of this invention only, but not to limit this invention.

Figure 1:
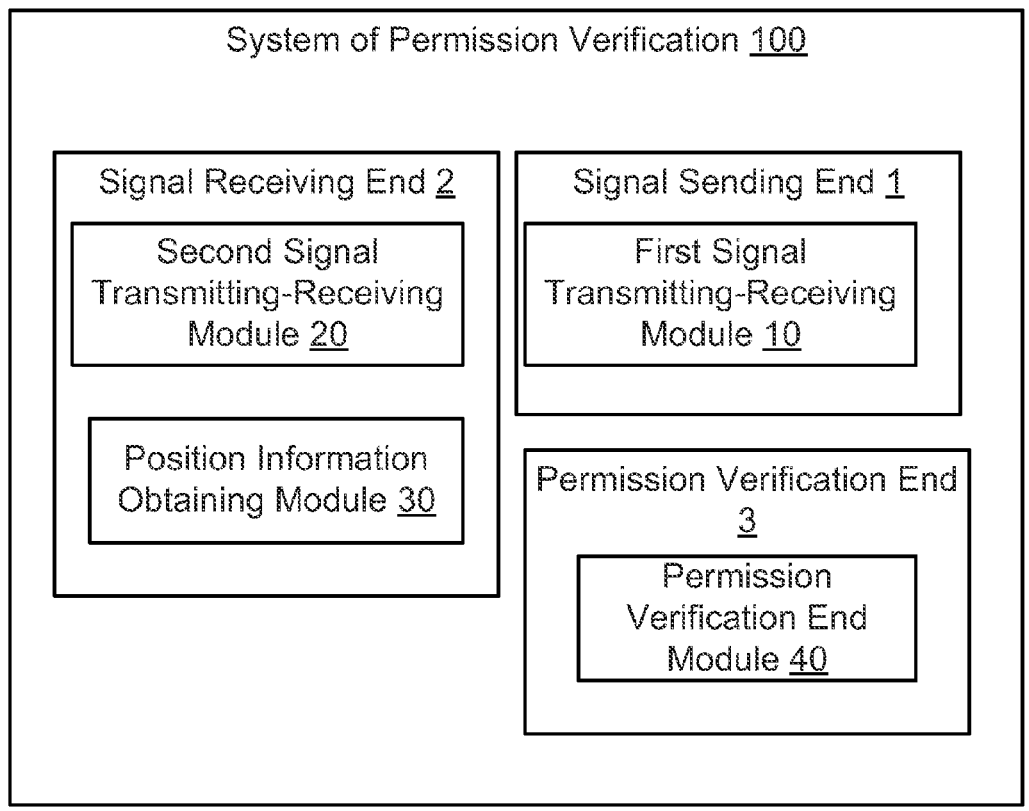
FIG. 1 is a block diagram of an embodiment of a location authentication system.

With respect to FIG. 1, in an embodiment, the location authentication system 100, includes at least a location base station 1, a mobile device 2, location authentication server 3, a first signal transmitting-receiving module 10, a second signal transmitting-receiving module 20, a position information obtaining module 30, and a position message validation module 40.

The location base station 1 is a base station that is used for transmitting the location of a region and then authenticate mobile devices that are in the region. Mobile device w is any mobile device, such as a mobile phone, laptop computer, tablet computer, and/or any other mobile device. The mobile device 2 is the mobile device whose position is being determined by location base station 1. Location authentication server 3 authenticates mobile device 2. The first signal transmitting-receiving module 10 is installed in the location base station 1. The location base station 1 uses the first signal transmitting-receiving module 10 for sending the signal carrying the position information of location base station 1 to the mobile device 2 within the same region as the location base station 1.

The second signal transmitting-receiving module 20 is installed in the mobile device 2. Mobile device 2 uses the second signal transmitting-receiving module 20 for receiving the signal marking the position information of location base station 1 sent by the first signal transmitting-receiving module 10. Mobile device 2 also uses the second signal transmitting-receiving module 20 for sending the position information of location base station 1 to the position message validation module 40 after the position information obtaining module 30 obtained the position information of the location base station 1.

The position information obtaining module 30 is installed in the mobile device 2. The mobile device 2 uses the position information obtaining module 30 for analyzing the signals and obtaining the position information of location base station 1.

The position message validation module 40 is installed in the location authentication server 3. The location authentication server 3 uses the position message validation module 40 for accessing whether the mobile device 2 is in the same region with the location base station 1.

In an embodiment, the first signal transmitting-receiving module 10 (which is installed in the location base station 1) sends the signal marking the position information of location base station 1 to the mobile device 2 within the same region as the mobile device 2. After the second signal transmitting-receiving module 20 (which is installed in the mobile device 2) receives the signal, the second signal transmitting-receiving module 20 obtains the position information of location base station 1 by the position information obtaining module 30 analyzing the signal. The second signal transmitting-receiving module 20 requests the position message validation module 40 (which is installed in the location authentication server 3) to access (and send) the location authentication information. The position message validation module 40 compares the position information sent by the second signal transmitting-receiving module 20 with the position information of location base station 1, to determine whether the mobile device 2 is in the same region as the location base station 1. The mobile device 2 obtains the location authentication information associated with staying in the same region as the location base station 1. In an embodiment, the signal marking the position information of location base station 1 (which was sent by the location base station 1) is a non-audible sound signal. The location base station 1 and the mobile device 2 are considered to be in the same region when the mobile device 2 is within the effective region of the signals sent by the location base station 1, so that mobile device 2 can receive the signal sent by the location base station 1 only while the within the range (or within the effective region) of the signal sent by the location base station 1. The region in which the location base stations is located is an indoors region or an outdoor region near a building-intensive environment. The region in which the location base station 1 is located is a suite or a room indoors, such as a room or suite of a shopping mall, an inn, a ward in a hospital, a lobby in a hospital (or other type of building), or another room in a hospital (or other type of building). When the location base station 1 is near building-intensive outdoor environments, the non-audible sound signals can only be received in areas between many buildings. The non-audible sound signals could be suitable in different areas having many buildings by adjusting the transmitting frequency of the non-audible sound signals. For example, the building intensive areas may be areas between two or more buildings, that are more than 30 floors high. As the non-audible sound signals often have less interference than an electromagnetic signal, the position of the mobile device 2 can be determined with a high degree of confidence, as long as the mobile device 2 is within the same region as the location base station 1. Specifically, sound waves are not affected by electromagnetic waves present in a room, such as are found near around a transformer, power lines and/or other electromagnetic devices. In an embodiment, the non-audible sound signal marking the position information of location base station 1 is a low frequency radio signal. In an embodiment, the position of the mobile device 2 can be determined within indoors by adjusting the transmitting frequency of the low frequency radio signal according to the specific environment that is within the same region as the location base station 1. The second signal transmitting-receiving module 20 could also include a sound wave receiving device such as a microphone. In particular, the non-audible sound signal may include an ultrasound signal and/or low frequency signal. In general, the ultrasound signal is above 20000 Hz and the low frequency signal is 16 Hz-25 Hz.

Figure 2:
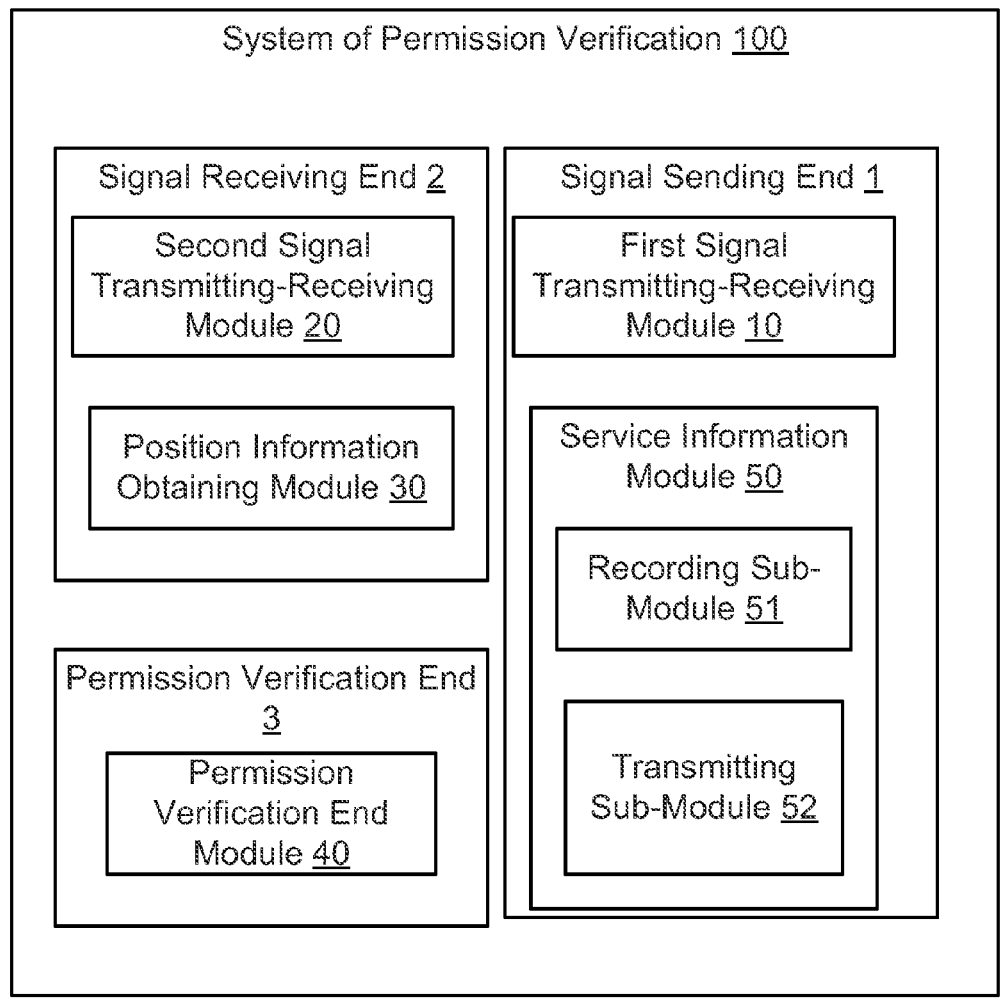
FIG. 2 is a block diagram of another embodiment of a location authentication system.

With respect to FIG. 2, in another embodiment of this invention, the system of location authentication 100, in addition to the elements of FIG. 1, includes at least service information module 50, recording sub-module 51, and sending sub-module 52. Service information module 50 is installed in the location base station 1. Location base station 1 uses service information module 50 for providing the service information to mobile device 2 after the position message validation module 40 verifies that the mobile device 2 is within the same region as location base station 1.

In an embodiment, the service information module 50 installed in location base station 1 provides the service information to the mobile device 2 after the mobile device 2 obtains the location authentication of position message validation module 40.

Specifically, in an embodiment, a service information module 50 includes recording sub-module 51 and sending sub-module 52.

Recording service information module 50 uses sub-module 51 for recording the information of mobile device 2 staying in the same region.

Alternatively, recording service information module 50 uses sending sub-module 52 for sending promotion information to mobile device 2 or for sending security information to the mobile device 2 (where the security information is associated with the region of the location base station 1).

In particular, recording sub-module 51 records the information of mobile device 2 within the same region as a location base station 1. The region, in which the location base stations 1 transmit signals, may include several different locations, which may include different types of places, such as in an arcade. Several location base stations 1, each having a first signal transmitting-receiving modules 10, may be separately installed in different shops in the arcade. The specific position information of each location base station 1 is different. When the users carry their mobile devices 2 (each having second signal transmitting-receiving modules 20) to a shop and obtains the information that indicates that a location base station 1 is in the same region with the mobile device 2, the recording sub-module 51 of location base station 1 records the information and may send service information to mobile device 2. As a result users that are in the related shop receive the service information, such as rewards points. System 100 may also keep track of staff attendance in a company. For example, when a staff carrying the mobile device 2 arrives in the office having the location base station 1, the recording sub-module 51 records the information of mobile device 2 when mobile device 2 is within the same region as the base stations 1. Instead of the staff manually clocking in and out, the information of the mobile device 2 is recorded for the convenience of the staff.

In an embodiment, transmitting sub-module 52 of location base station 1 may send promotion information to the mobile device 2. The promotion information could be the information about the products and/or services of a shop. The promotion information may attract users to go to the shop, and thereby increase the profits of the business. As another example of service information that may be sent, the transmitting sub-module 52 may send security information to the mobile device 2. For example, several location base stations 1 could be installed in different wards in a hospital, and doctors and nurses may carry mobile devices 2. When a doctor or a nurse is in front of the ward, the mobile device 2 receives the security information sent by the transmitting sub-module 52 within the same region after accessing the location authentication. The information could be a piece of 2D information (2-dimension information, such as a latitude and longitude or and x and y coordinate) indicating the location of the doctor or nurse. The doctor or the nurse could use the security information that was received to open the ward's door. Thus, the security information may prevent other people from getting into the ward to disturb patients while the patients are resting and receiving treatment. The security information could also make it more convenient for the doctors and nurses to use the security information to get into wards.

Figure 3:
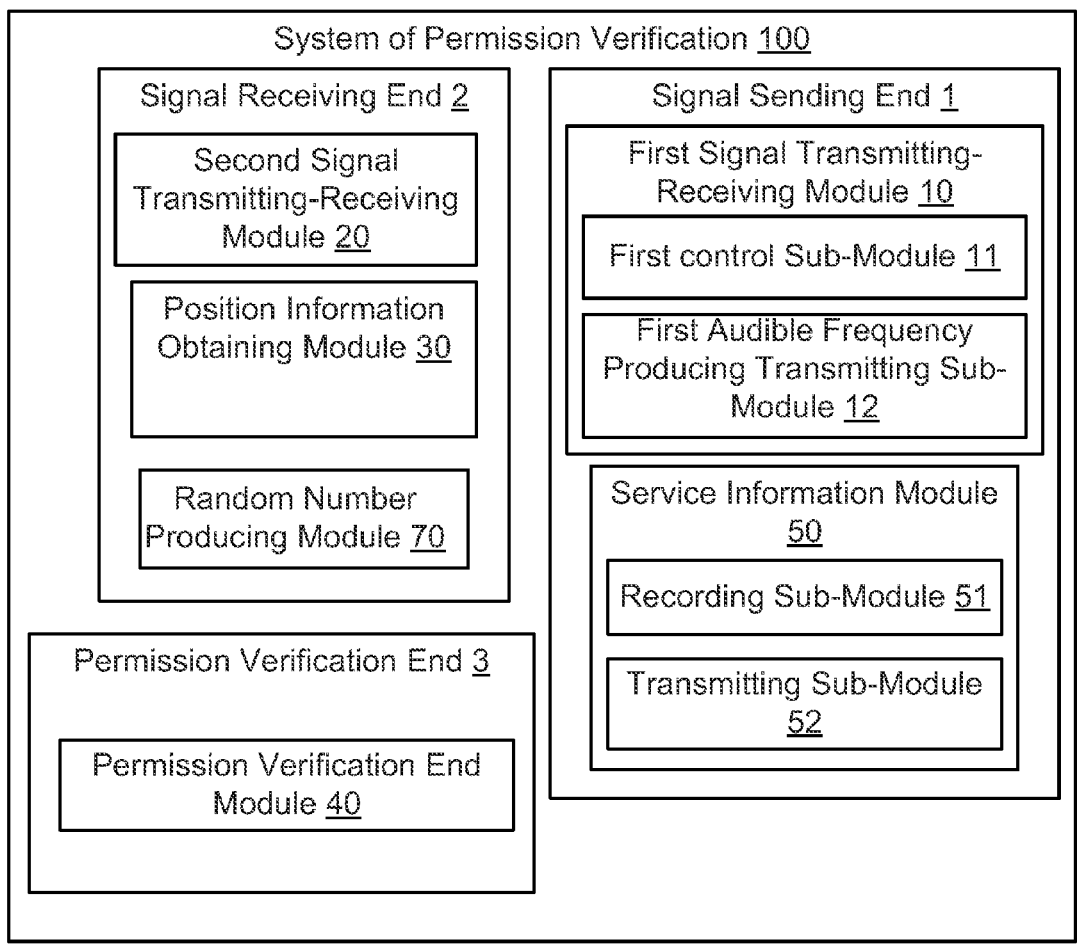
FIG. 3 is a block diagram of another embodiment of a location authentication system.

With respect to FIG. 3, in an embodiment, in addition to the elements discussed in conjunction with FIGS. 1 and 2, the first signal transmitting-receiving module 10 includes first control sub-module 11 and first audible frequency generating-transmitting sub-module 12.

First signal transmitting-receiving module 10 uses first control sub-module 11 for controlling the first audible frequency generating-transmitting sub-module 12 to generate the predefined first frequency.

Alternatively, first signal transmitting-receiving module 10 uses first control sub-module 11 for controlling the first audible frequency generating-transmitting sub-module 12 to generate the first set of frequencies corresponding to the first set of multi-bit information.

Alternatively, first signal transmitting-receiving module 10 uses first control sub-module 11 for controlling the first audible frequency generating-transmitting sub-module 12 to generate the non-audible sound signal sent in an alternating fashion (alternating between sending and not sending a signal), by sending the predefined second set of frequencies for a predetermined period of time, then not sending any signal for a predetermined period of time, and then sending a third set of frequencies for a predetermined period of time (the predetermined periods of time may be the same or different in lengths of time). The non-audible sound signal corresponds to the second set of multi-bit information.

Alternatively, first signal transmitting-receiving module 10 uses first control sub-module 11 for controlling the first audible frequency generating-transmitting sub-module 12 to generate the third set of frequencies corresponding to the third set of multi-bit information generated randomly.

First signal transmitting-receiving module 10 uses the first audible frequency generating-transmitting sub-module 12, for generating the first frequency according to the control of first control sub-module 11, and sends the non-audible sound signal by the predefined first frequency.

Alternatively, first signal transmitting-receiving module 10 uses the first audible frequency generating-transmitting sub-module 12, for generating the first set of frequencies, and sending the first set frequencies.

Alternatively, first signal transmitting-receiving module 10 uses the first audible frequency generating-transmitting sub-module 12 for spacing the predefined second frequency and third frequency (corresponding to the second set of multi-bit information) with the first time interval, and sending in an alternating fashion (alternating between sending and not sending a signal) the second set of frequencies for a predetermined period of time, not sending a signal for a predetermined period of time, and the third set of frequencies for a predetermined period of time (the predetermined periods of time may have the same or different lengths).

Alternatively, first signal transmitting-receiving module 10 uses the first audible frequency generating-transmitting sub-module 12 for generating the third set of frequencies, and sending the non-audible sound signal by the predefined third set of frequencies.

In the embodiment of FIG. 3, the first control sub-module 11 controls the first audible frequency generating-transmitting sub-module 12 to generate the first frequency, which may be, for example, 20000 Hz. The first audible frequency generating-transmitting sub-module 12 sends the non-audible sound signal of the first frequency after generating the fixed non-audible frequency. Alternatively, the first control sub-module 11 controls the first audible frequency generating-transmitting sub-module 12 to generate the first set of frequencies. The first set of frequencies corresponds to the first set of multi-bit information, which may be for example, 100101. The first control sub-module 11 controls the non-audible frequency time interval, which could be set as the smallest time interval that could be recognized by the mobile device 2. If the smallest time interval is 50 Hz, the mobile device 2 could recognize the non-audible frequencies of 20000 Hz and 20050(20000+50) Hz and distinguish the difference between 20000 Hz and 20050 Hz. If the non-audible frequency time interval is 50 Hz, assuming that the required coding information is "100101", the frequency range is 20000 Hz-20250 Hz, and the stepped-frequency (time interval) is 50 Hz, then the signal sending module 10 could send the acoustic signals that have the frequency values of 20000 Hz, 20150 Hz, 20250 Hz etc., which could be distinguished form one another. The relations between the corresponding multi-bit units of the first set of multi-bit information and the frequencies are shown in Table 1:

TABLE 1

| first bit unit (1) | 20000 Hz (signal sent) |
| second bit unit (0) | 20050 Hz (nosignal sent) |
| third bit unit (0) | 20100 Hz (no signal sent) |
| fourth bit unit (1) | 20150 Hz (signal sent) |
| fifth bit unit (0) | 20200 Hz (no signal sent) |
| sixth bit unit (1) | 20250 Hz (signal sent) |

With respect to Table 1, the information uses 6 bits for coding. Each bit of information is at a frequency that is 50 Hz higher than the preceding bit. For example, the first bit corresponds to frequency 20000 Hz. The next corresponds to frequency 20050 Hz; . . . the next bit corresponds to frequency 20250 Hz. When a particular bit is a '1' a signal is sent at the frequency that represents that bit. When that same particular bit is a zero no signal is sent at the frequency representing that particular bit (or worded differently silent signal is sent). In the embodiment of FIG. 3, the first bit is a '1', and consequently the first bit is represented by an acoustic signal of frequency 20000 Hz. The second bit is a '0,' and consequently, does not send an acoustic signals of frequency 20050 Hz. In other words, when the bit is a '1', the corresponding acoustic signal of that frequency is generated. However, when the bit for a particular frequency is a '0', no acoustic signals are generated that correspond to the frequency that represent that bit.

In an embodiment, the first control sub-module 11 controls the first audible frequency generating-transmitting sub-module 12 to generate the second frequency and third frequency corresponding to the predefined second set of multi-bit information spaced by the first time interval. In other words, each bit is distinguished from the last bit according to the duration of time interval in which the signal is sent. For each duration of time one of two frequencies are sent (e.g., 20000 Hz and 21000 Hz) one of the two frequencies represents a '1' and the other represents a zero.

For example, if the first control sub-module 11 controls the first audible frequency generating-transmitting sub-module 12, the first audible frequency generating-transmitting sub-module 12 may be configured to only send a high and a low frequency, which may be the second frequency and the third frequency of the prior embodiment (see table 1), such as 20000 Hz (which may represent a '0') and 21000 Hz (which may represent a '1') (in a different embodiment a different pair of frequencies may be used). In an embodiment, the signals used are not much higher than these signals (for example when using the WAV standard the frequency of the two signals is kept significantly less than 44100 Hz, for example 50 Hz less than 44100 Hz). The duration of the sound recorded, which may be (21000−20000)=0.001 s, is recorded and the 2 frequencies may be distinguished by a Fast Fourier Transform (FFT). Using a longer difference in durations of time that represent different bits could enhance the accuracy of decoding. For example a long duration difference, such as 0.005 s could be used. Then the duration of the ultrasound information should be a multiple of 0.005 s. If the bit '1' has to be transmitted in each duration of time, the frequency 21000 Hz should be sent. If the information '0' has to be transmitted, the frequency 20000 Hz should be sent. For example, if the information '0101' has to be transmitted, the formula in the following Table 2 could be used:

TABLE 2

| | Information bit | | | |
| --- | --- | --- | --- | --- |
| | 0 | 1 | 0 | 1 |
| Duration | 0-0.005 s | 0.005-0.010 s | 0.010-0.015 s | 0.015-0.020 s |
| Sending frequency | 20000 Hz | 21000 Hz | 20000 Hz | 21000 Hz |

Figure 4A:
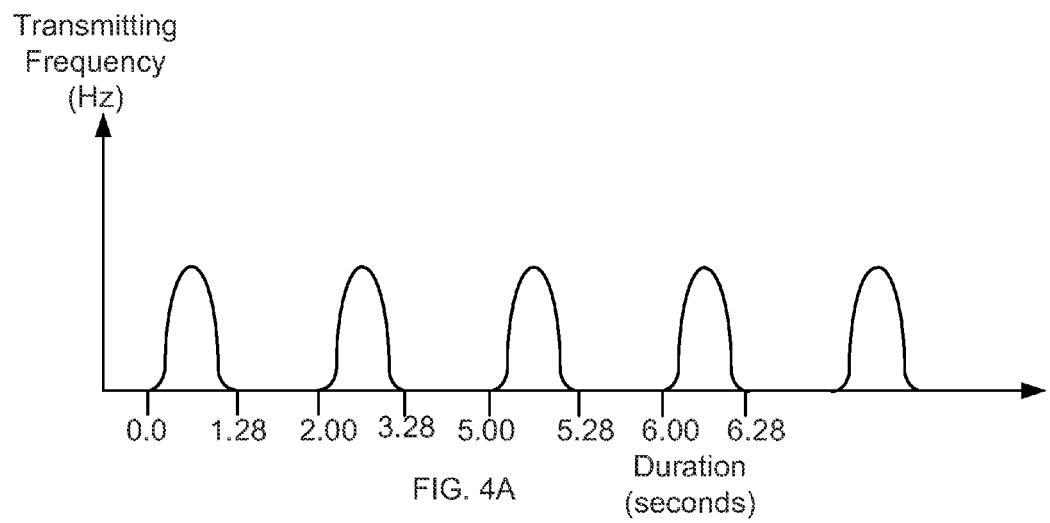
FIG. 4A is plot of an embodiment of the signal that carries the position information of location base station.
Figure 4B:
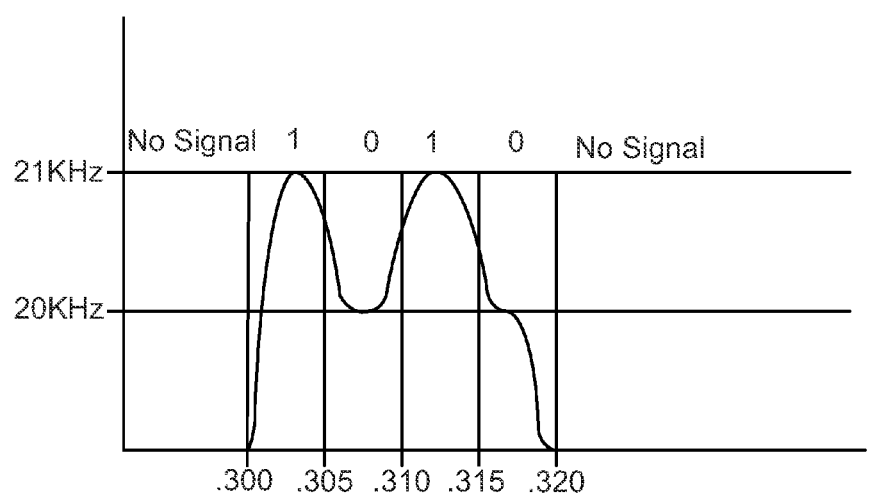
FIG. 4B is a plot of an embodiment the signal carrying the decryption of the position information of the location base station.

In the embodiment of Table 2, one bit 1 of information may be coded in 0.005 s and 256-bits of information may be coded in 1.28 s. As the ultrasound is unusual in the environment, it is safe to represent the beginning and end of each piece of information with silence. The same information may be sent repeatedly, or more information may be sent by inserting a space (e.g., a duration of time in which no signal is sent or a signal representing a break between pieces of information is sent) to divide each piece of information. For example, if the duration is 1 to 2 s, the information may be sent as according to Table 3:

To decode the information, the mobile device 2 calculates the frequency of receiving sound within a window that is 0.005 s wide by an FFT (Fast Fourier transform), and by examining whether the frequency of the strongest signal is close to 20000 Hz, 21000 Hz or is silent (or another frequency representing a break between pieces of information). For example, consider the example of sending the '1010, assuming that the smartphone is decoding. Before the information begins, the silent mode would last for 0.3 s. Then, the procedures of coding and decoding would perform as FIG. 4A and FIG. 4B.

TABLE 3

| | Duration | | | | |
|---|---|---|---|---|---|
| | 0-1.28 s | 1.28 s-2 s | 2 s-3.28 s | 3.28 s-4 s | above 4 s |
| Transmitting frequency | ultrasound represents 256-bit information | Silent | ultrasound represents 256-bit information | Silent | repeat . . . |

Figure 5:
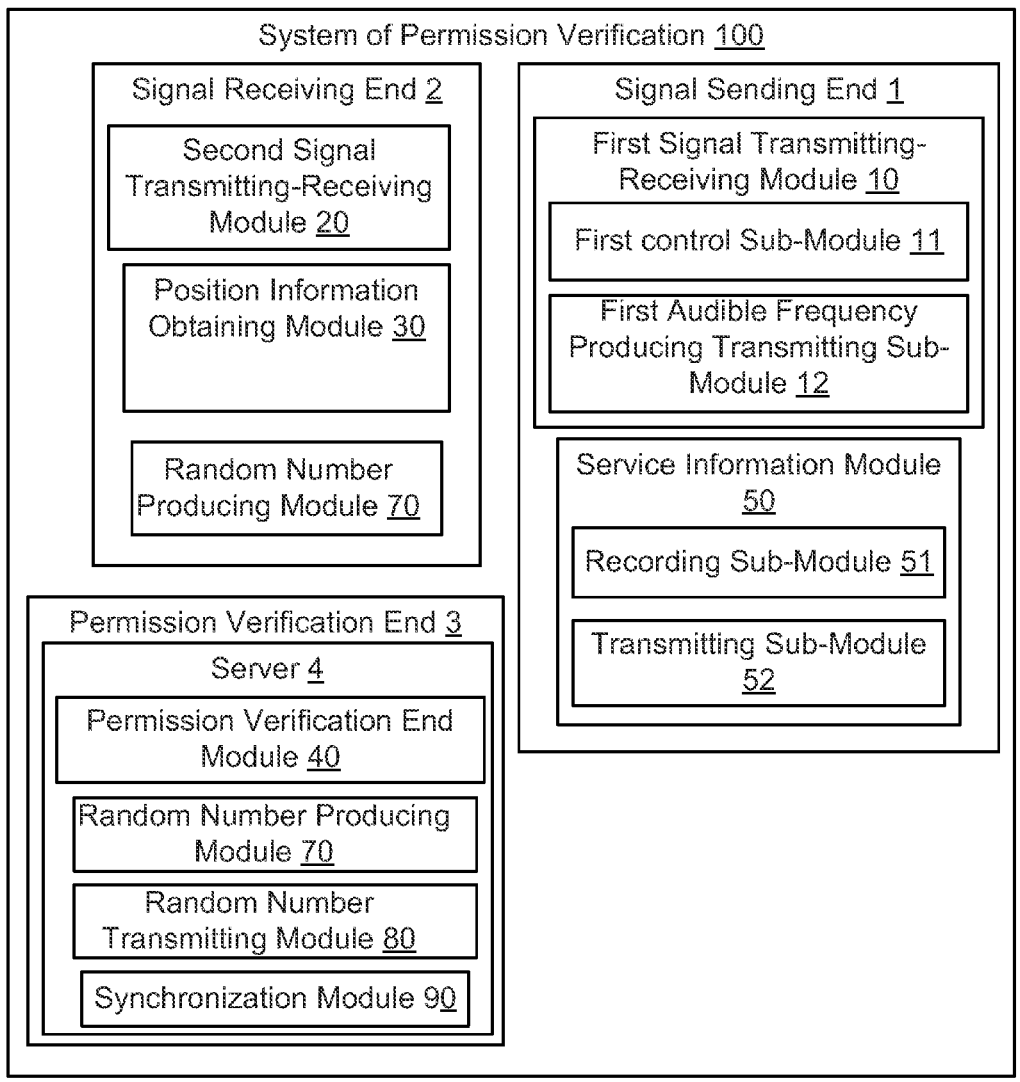
FIG. 5 is a block diagram of another embodiment of the location authentication system.

With respect to FIG. 5, in an embodiment, if the first control sub-module 11 controls the first audible frequency generating-transmitting sub-module 12 to generate the third set of frequencies, the third set of frequencies corresponds to the third set of multi-bit information, which may be generated randomly. The location authentication system 100 includes at least random number generating module 70 and random number transmitting module 80 (in addition to the elements discussed above and discussed in conjunction with FIGS. 1-3).

Random number generating module 70 is installed in the server 4 of location base station 1 or in the location base station 1, server 4 uses random number generating module 70 for generating the third set of multi-bit information randomly.

Random number transmitting module 80 is installed in the server 4 of location base station 1, server 4 uses random number transmitting module 80 for transmitting the third set of multi-bit information to the first signal transmitting-receiving module 10 after the server 4 of location base station 1 generated the third set of multi-bit information.

The location base station 1 shares the third set of multi-bit information generated randomly with its server 4. The location base stations generate several pieces of the third set of multi-bit information in several days, respectively. The random number generating module 70 installed in the server 4 may also generate the several pieces of third set of multi-bit information, randomly, the several pieces of third sets of multi-bit information correspond to the location base stations 1, respectively. The several pieces of third sets of multi-bit information spaced by the predefined third time interval may be regenerated (and/or resent) periodically. For example, the several pieces of third sets of multi-bit information may be regenerated daily. Thus, in this example, the position information of the location base stations 1 are different every day, which helps prevent an unauthorized mobile device 2 from obtaining the location authentication code of being in the same region as the signal sending 1 without permission. One of the methods is shown in Table 4:

TABLE 4

| | the $0^{th}$ day | the $1^{st}$ day | . . . | the $1023^{rd}$ day |
|---|---|---|---|---|
| the first location base station | 5431654345 | 6453515313 | | 5534135414 |
| the second location base station | 5251443412 | 1854343356 | | 8198354891 |
| . . . | . . . | . . . | . . . | . . . |
| the Nth location base station | 3568135483 | 9868343535 | | 3543545135 |

Table 4 assumes that the use of 40 bits of information. However, another number of bits of information may be used, such as the information of 60 or 20 multi-bit. In Table 4 (above), each interval comprises a random number formed by 40 bits. To express the random number conveniently, the binary bits are represented in base 10 in Table 4. The information could be sent by location base stations 1 over the course of many days. The random number generations need a good source, such as the server 4 of location base station 1. Each number in each column of numbers of Table 4 are unique, to ensure that the decoding and sending of these random numbers results in an unambiguous determination of the location. When generating a new random number, server 4 or location base station 1 determines whether the random numbers are the same as the randomly generated numbers listed in each column within every interval. If a newly generated random number is a repeat of another random number listed in the same column, another new random number is generated and used instead of the prior random number. If some random numbers are repeated, but are in different rows, the repetition is acceptable. Examination of rows to check for repeated random numbers is not necessary, because in general the numbers within the same row will be different since the numbers are generated randomly. Optionally, the system may also check that new randomly generated numbers are each different from the prior randomly generated numbers in the same row and/or check that in each row the newly generated numbers are different from the last n generated numbers in the same row. To check for two random numbers being in use simultaneously, server 4 or location base station 1 could examine all random numbers within the same column circularly. In other embodiment all random numbers that are currently in use are stored, and each time one random number is updated with a new random number, all of the other random numbers still in use are checked. When having more location base stations 1, server 4, or location base station 1 could use a Hash Table to accelerate the generation of random numbers, the Hash Table may be generated off-line and stored.

To further elaborate on the use of hash tables, using a base 10 hash table, if random number is 6 digits, the possible values range from 000000 to 999999. In order to check the value of a particular number, a table of 999,999 entries of bits may be used. If the value of a particular bit is '1', it means that number has been used. A simple example of hash table only take the first 5 digits as the index (or keys) to the table, meaning that the table having a size of 99,999 is used. As a result of using the first five digits as keys, the hash table is 90% smaller than a table of every possible value. As a consequence of marking the used numbers, if a random number, such as 123,456 was used, then that number (e.g., 123,457) cannot be used a second time. As a trade-off that only 99,999 possible random number can be used if the randomly chosen numbers have 6-digits. However, when generating the code to check whether a number has been used, the required table size for all possible values is less than if a hash table was not used. As a result of the smaller table, the processor time required to process the table is less than for other types of tables.

Alternatively, a binary tree search may be used in which all of the random numbers in use are placed into a tree. The first set of branches are all of the random numbers with the same first digit. Each of those branches has one branch for each random number with the same second branch. So, using a binary hash table, initially there would be two branches—one for all the numbers with a leading 1 and one for all the numbers with a leading zero. Each of those branches is further divided into two branches—one branch of all the numbers in that branch has the second digit that is a zero and one branch for all the random numbers in that branch for which the second digit has a value of '1'.

Lastly, filters could be used to increase the efficiency of searching for random numbers in use. For example, first all random numbers in use are filtered to remove all random numbers in use that do not have the same leading digit as the newly generated random number. The remaining random number are further filtered to remove all of the remaining random numbers in use that do not have the same second digit as the new generated random number. Similarly further filters are applied digit by digit until either there are no more random numbers in use to filter out, indicating that the newly generated random number is not currently in use yet, or until a filter has been applied for each digit of the newly generated random number. If a filter has been applied for each digit of the newly generated random number and there is still a number that has not been filtered out, the newly generated random number is a duplicate of the one in use. Otherwise, the newly generated random numbers is not a duplicate of any random numbers in use.

In an embodiment, the first frequency corresponds to the predefined first position coding. The first position coding marks and/or includes the position information indicating that the receiver of the first position coding is within the same region as the location base station 1 that sent the first position coding.

The first set of multi-bit information corresponds to the predefined second position coding. The second coding marks and/or includes the position information indicating that the receiver of the second position coding is within the same region as the location base station 1 that sent the second position coding.

The second set of multi-bit information corresponds to the predefined third position coding. The third coding marks and/or includes the position information within the same region.

The third set of multi-bit information corresponds to the predefined fourth position coding. The forth coding marks and/or includes the position information within the same region.

In such an embodiment, system 100 may include a location base station (such as location base station 1) in every location of interest, such as every room indoors of a particular establishment. Each location base station marks and/or includes the room that the base station is located. The position within the same region, which means that the location base station is in one of the regions of a specific range of areas indoors. In an embodiment, the position information marked by each location base station is different. The different position information could be coded by different non-audible frequencies to form different non-audible sound signals of a different frequency (or a different set of frequencies). In such an embodiment, a 6 bit position code can accommodate 31 position codes that can be assigned to 31 rooms. For example, 000001 corresponds to the second position, coding 1 to represent room 1. 000011 corresponds to another second position coding 3 to represent room 3 etc. The specific relationship between code numbers and rooms is shown in Table 5. The position code could correspond to the room information directly by using multi-bit information without corresponding to the specific position coding.

In the example of Table 5, 7 bits may represent a room, Table 5 may be used to lookup the code corresponding to a particular room. Alternatively, a number of bits may be used just to represent the ASCII code of 'Room 1', 'Room 2', etc. That is, the translation table in not necessary, and another program may handle determining the location. Also, the coding of the location may be in terms of longitude, latitude, and height above see level (which may be the first set of frequencies, second set of frequencies and third set of frequencies). The location base station may invoke another program (e.g., a map program) to determine the position, and use of Table 5 is not mandatory.

The position code can mark which areas the users are near, or more precisely, which building the user is near or which room the user is in. In an embodiment, the first set of frequencies is sent as a set of ultrasound signals. In a prosperous, cosmopolitan setting the position coding information may be regions between high buildings could help users entering buildings. When users are in the region, the users can use the handheld mobile device 2 to receive the signal sent by the location base station 1 to obtain the corresponding position coding information (which can be used by the user to verify that the building is the one that the user is looking for or to automatically clock the user into work). After accessing the location authentication, the user can enter the building. (In other embodiments, the coding information may open a door of the building before enter a gate. Using the coding information, a mobile phone may be used instead of a key access card, as a way of opening a door to enter a building, depending on the implementation and where the base stations is installed.)

TABLE 5

| Room | Multi-bit information |
|---|---|
| 1 | 000001 |
| 2 | 000010 |
| 3 | 000011 |
| ... | ... |
| 31 | 111111 |

To summarize the information in FIGS. 4 and 5, the location information sent by the base station is not a static value. In a simple embodiment, as in Table 5, each location has a static code that represents a room or other location/region. In Table 4, the codes representing the rooms or other location/region are generated by a random number generator, and each day, the code representing a particular room, location, or region is changed.

Figure 6:
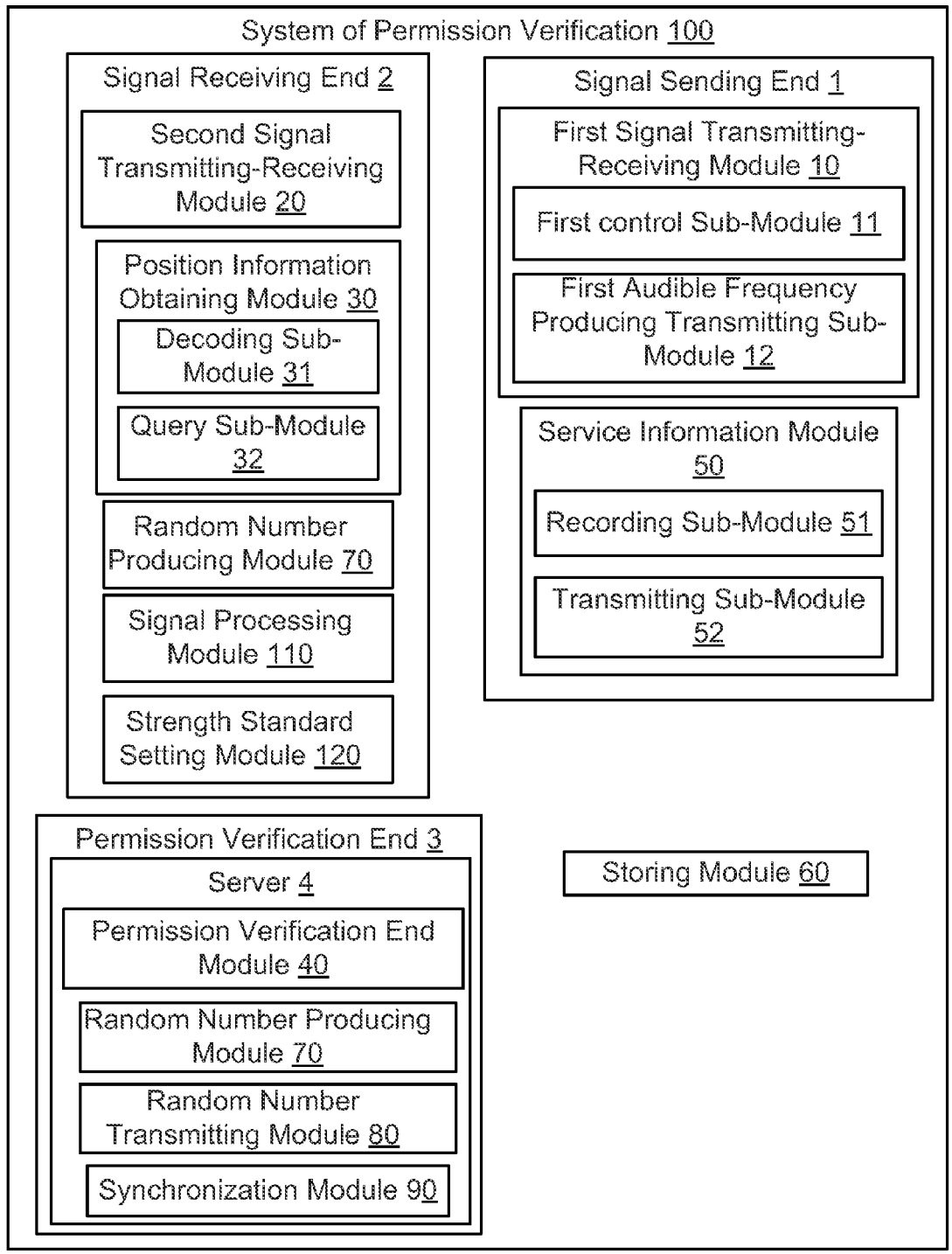
FIG. 6 is a block diagram of more embodiments of the location authentication system.

With respect to FIG. 6, in an embodiment, the first position coding, the second position coding, the third position coding, and the fourth position coding correspond to one unit of position information in a predefined query table of position information (such as Table 5), respectively. For example, the first position coding, the second position coding, the third position coding, and the fourth position coding may represent the latitude, longitude, altitude, and a security code (the security code may be a randomly generated number).

The position information obtaining module 30 may include decoding sub-module 31 and query sub-module 32.

Position information obtaining module 30 uses decoding sub-module 31 for decoding the first set of frequencies, which may be a non-audible sound signal sent in an alternating fashion (alternating between sending a signal and not sending a signal) by sending the predefined second set of frequencies for a predetermined period of time, then not sending a signal for a predetermined period of time, and then sending a third set of frequencies for a predetermined period of time (the predetermined periods of time may be the same or different in length) and obtain the first set of multi-bit information, the second set of multi-bit information, and the third set of multi-bit information by the third set of frequencies, respectively.

Position information obtaining module 30 uses query sub-module 32 for querying the position information corresponding to the first position coding, second position coding, the third position coding, and the fourth position coding to obtain the position information of location base station 1.

With respect to FIG. 6, in an embodiment, the system 100 also includes a storing module 60. Storing module 60 is used for storing the query table of position information. The storing module 60 may be installed in the mobile device 2, in the location base station 1, or in the location authentication server 3.

The storing module 60 may be installed in different ends (that is installed in sending end 1 and receiving end 2), including the storing module 60 of location base station 1, mobile device 2, or location authentication server 3. The query table of the position information could be updated regularly (e.g., periodically) and/or in real time depending on the users' requirements. The size of storing module 60 could refer to the information quantity in the query table of the position information. Taking the Table 4 as an example, each information quantity is 40 bits, and consequently table 4 requires 40 bits*1024=40 Kb=5 KB, which means 1 Megabyte of storage is more than enough for system 100 to work.

Additionally, in one embodiment, the location authentication security could be enhanced by combining the security code sent by the location base station 1 with a one-use multi-bit information code (which might also be referred to as a one-time token). In practice, the one-use codes may be randomly generated numbers that are valid as codes for a very short amount of time, such as 10 seconds, 1 second, or less. Combining the security code and the one-use multi-bit information code also provides more coding space for multi-bit information codes, because smaller randomly multi-bit information codes may be used for coding the regions, while still providing the same amount or a greater amount of security when combined with the one-use multi-bit information code. To prevent the malicious attacks, such as attacks that involve generating numbers randomly, the storing module 60 installed in the server 4 of mobile device 2 could place a limit on the number of one-use generated random numbers that are generated during a given period of time. Consequently, even if too many requests for one-use codes are received, the system does not shut down. Furthermore, a speed restriction could be used to monitor the mobile device 2 accessing the server 4 or other related equipment of location base station 1. If a mobile device 2 sends requests for inquiry frequently enough that the speed of other equipment work slowly, the slowness of the equipment may block the access port of that specific mobile device 2. If all numbers are generated safely, only one number in 256 (8 bit) is required to fool the authentication. When representing the information of 40 bit and sending over $2^{(40-8)}=4294967296$ pieces of information to the location base station 1, only 1 out of 256 randomly guessed numbers could succeed to fool the authentication.

Installing the storing module 60 in local terminals, such as the mobile device 2 or location base station 1 could save the terminal battery of mobile device 2 to enhance the efficiency of inquiring. The stored information could be updated regularly from the server 4. When the mobile device 2 enters different regions, such as entering another arcade from an arcade, mobile device 2 could request from server 4 in an arcade (or other location) to again send the query table of position information of entering the new arcade.

In one embodiment, the position message validation module 40 is installed in the server 4 of location base station 1 or in the location base station 1, the position message validation module 40 verifies whether the mobile device 2 is in the same region with the location base station 1, via the position information sent by the second signal transmitting-receiving module 20. Via the location base station 1 or the server 4 of location base station 1, validating the location authentication of whether the mobile device 2 is in the same region with the location base station 1 could enhance the success of verification and security.

Figure 7:
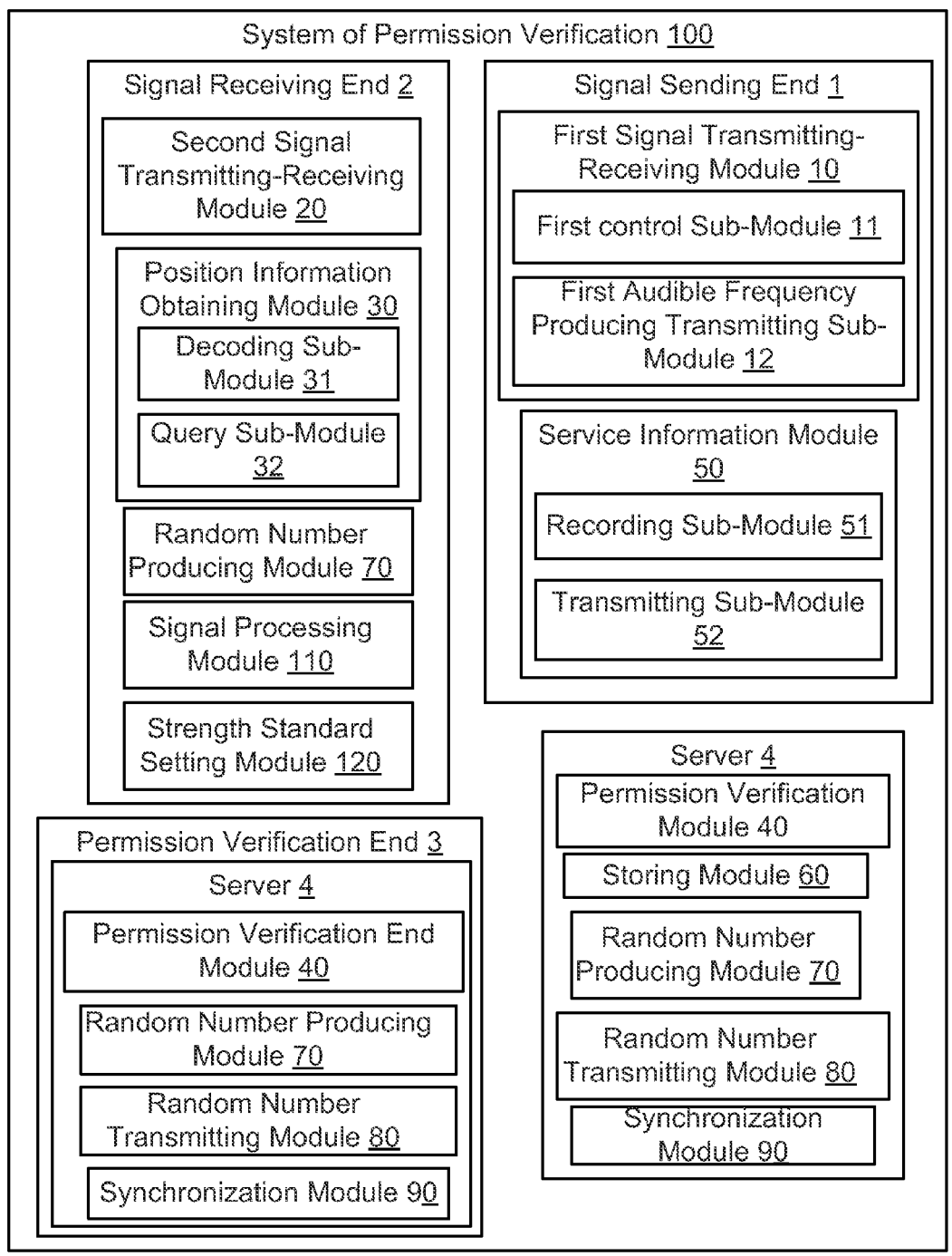
FIG. 7 is another embodiment a location authentication system.

With respect to FIG. 7, in an embodiment, system 100 includes several synchronization modules 90 that are installed in several servers 4 of location base stations 1, respectively. The servers 4 comprise at least one main server and at least one synchronization server 4. The synchronization module 90 of synchronization server 4 synchronizes the query table of position information (of the different servers 4 with one another) by the predefined second time interval with the synchronization module 90 of main server 4. For example, the synchronizing of the query table of position information may be performed once a day, every 12 hours, or another period of time. Synchronizing, via the synchronization server 4, secures the stability of the system 100 to avoid losing data. For example, even if the query table of position information is lost, the synchronization server 4 could retrieve the table.

In the above embodiments, the location authentication system 100 comprises several mobile devices 2 and several location base stations 1; the location base stations 1 are installed in different regions to suit different applications.

Additionally, in other embodiments, the system also provides devices for meeting any of the mentioned location authentication system 100. The system 100 provides the device for the mobile device 2 of location authentication system 100, the device for the location base station 1 and the device for the location authentication server 3. The structures of these devices are mentioned in the above embodiments, detailed descriptions would not be mentioned here.

With respect to FIG. 7, in one of the above embodiment, there are several location base stations 1 within the same region. The first signal transmitting-receiving ends 10 of location base stations 1 within the same region send the signal marking the position information of location base station 1, respectively.

The mobile device 2 also includes signal processing module 110, strength standard setting module 120, and second signal transmitting-receiving module 20.

The mobile device 2 uses signal processing module 110 for filtering the signals that are below the strength standard sent by the first signal transmitting-receiving modules 10 of location base stations 1 according to the predefined signal strength.

The mobile device 2 uses strength standard setting module 120 for calculating the mean signal strength received in the predefined period, and for setting the predefined signal strength according to the mean strength.

The second signal transmitting-receiving module 20 receives the signals that are above or equal to the predefined signal strength that was filtered by the signal processing module 110.

In the above embodiment, the predefined signal strength set by the strength standard setting module 120 is double the mean signal strength or at least above of signals received by the mobile device in the predefined period.

The second signal transmitting-receiving module 20 receives the first signal meeting the predefined signal strength.

When the signals are sent by the first signal transmitting-receiving modules 10 (of location base stations 1) (the signals sent are not above or equal to the strength standard), the second signal transmitting-receiving modules 20 of mobile devices 2 receive the first transmitted signal sent by the location base stations 1.

Also, signals marking the position information of the location base station sent by several location base stations 1 may have the same or different frequency.

In the above embodiment, it is inevitable that the mobile device 2 would receive more than one effective signal sent by the location base station 1 in some places. In an embodiment, the mobile device 2 includes a signal processing module 110 to deal with the redundant effective signals sent by the location base station 1. The signal processing module 110 filters the received signals whose strengths (Bel) are not suitable. In particular, the strength standard setting module 120 could set signal strength value at the filtering point in advance, such as 10 dB (decibel). When the predefined signal strength of a signal sent by the location base station 1 is below the predefined signal strength, the signal processing module 110 filters the signal, removing the signal. When the predefined signal strength of a signal sent by the location base station 1 is above the predefined signal strength, the signal sent by the location base station 1 is chosen and received by the second signal transmitting-receiving module 20.

When the strength standard setting module 120 sets the predefined signal strength, such as before obtaining the position of mobile device 2, the mobile device 2 monitors the potential received signals of location base station 1 in a predefined duration of time. The predefined duration of time for measuring the mean signal strength could be 0.1 second. If the mean signal strength is S, S would be the predefined strength standard. The signal processing module 110 chooses the first signal sent by location base station 1 when the strength of the first signal is above 3×S. If the signal processing module 110 only receives one effective signal sent by location base station 1 or if the signals received are below the strength standard, the signal processing module 10 chooses the first effective signal sent by location base station 1. The distance between location base station 1 and mobile device 2 is judged by the signal strength. Determining the distance by the signal strength ensures the reception of the required signal sent by location base station 1 by setting the predefined strength standard value to a specific value.

Figure 8A:
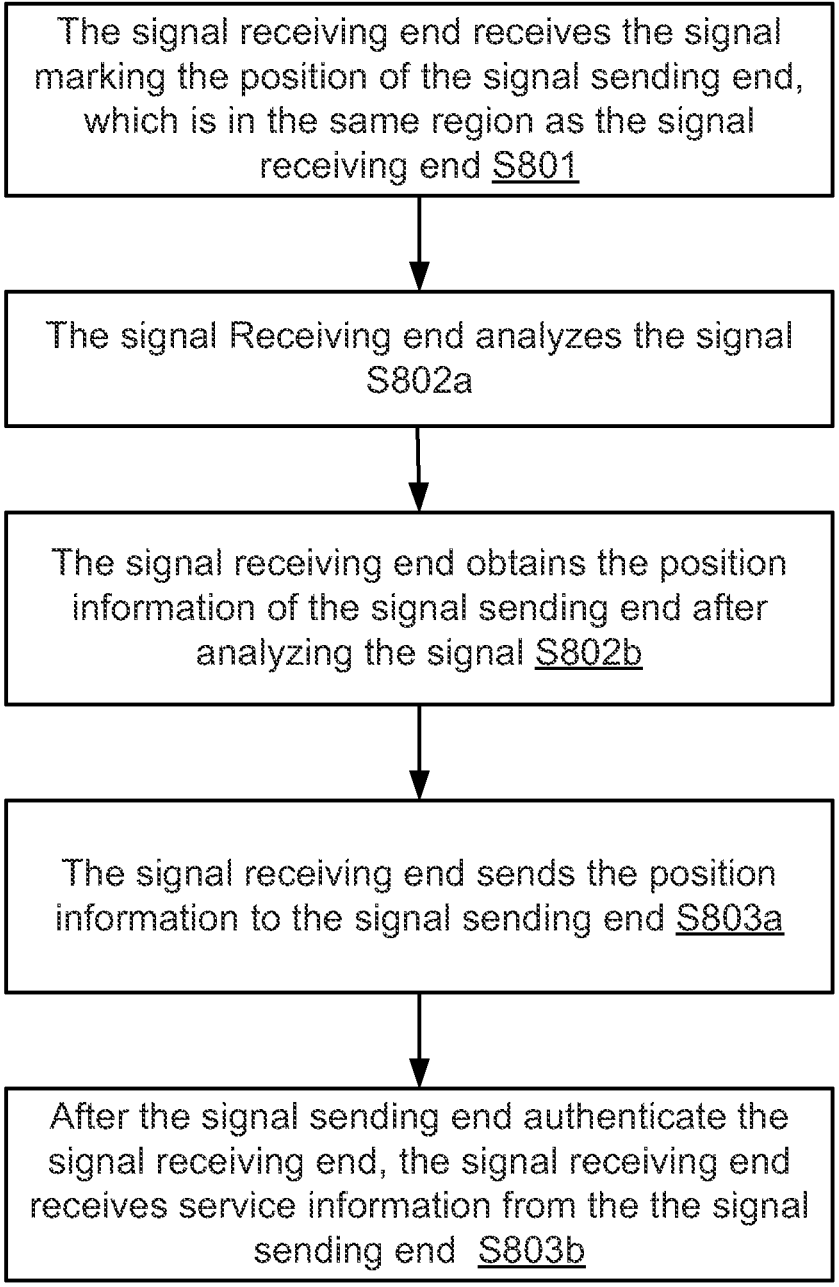
FIG. 8A is a flowchart of an embodiment authentication a location of a mobile device from the point of view of the mobile device.

With respect to FIG. 8A, in an embodiment, system 100 implements a method of location authentication. The method comprises the following steps.

Figure 8B:
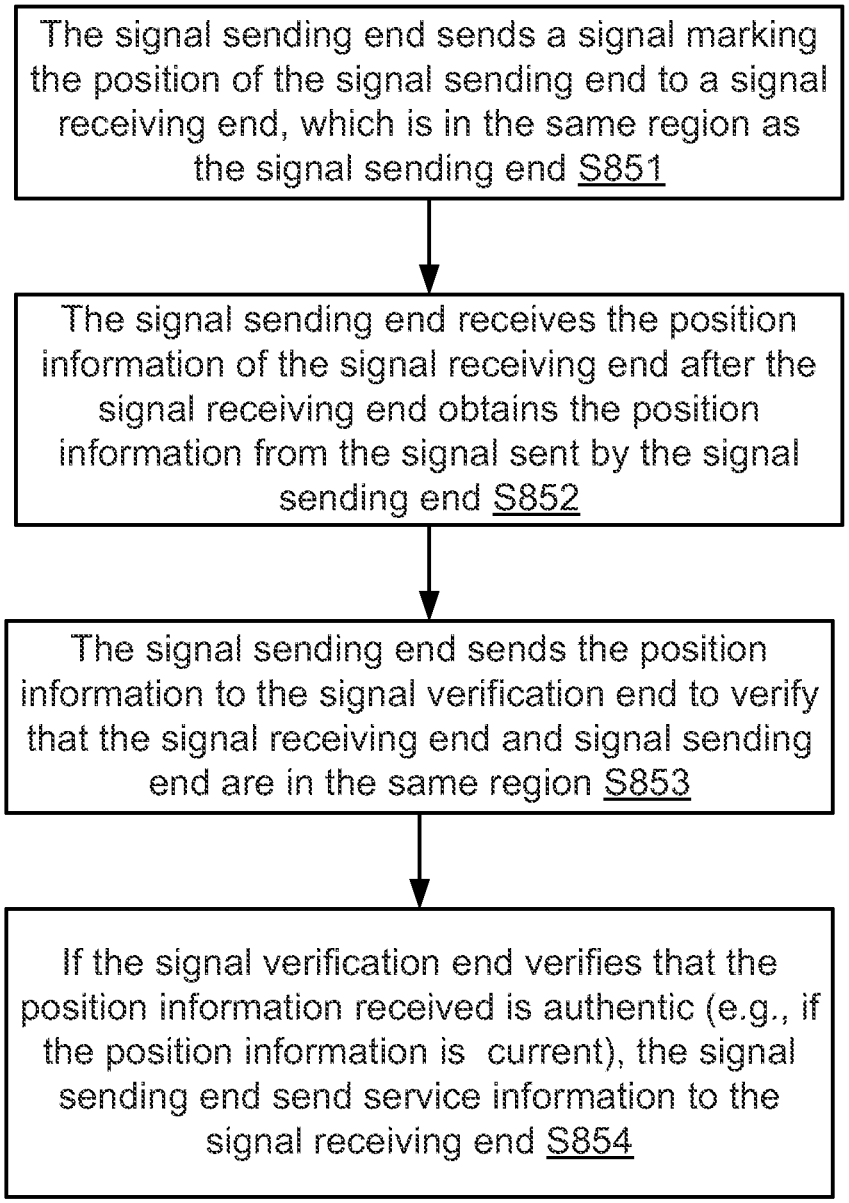
FIG. 8B is a flowchart of an embodiment authentication a location of a mobile device from the point of view of the location base station.

The method of FIG. 8A is performed by the location base station 1. In contrast, the method of FIG. 8B are performed by the mobile device 2. The methods of FIGS. 8A and 8B are complementary in that every time the location base station sends a signal in the method of FIG. 8A, the mobile device receives the same signal in the method of FIG. 8B. Similarly, every time the location base station 1 receives a signal in the method of FIG. 8A, it is the result of the mobile device 2 sending the same signal in the method of FIG. 8B (and vice versa).

In steps S801, the second signal transmitting-receiving module 20 of mobile device 2 receives the signal marking the position of location base station 1 sent by the first signal transmitting-receiving module 10 of location base station 1 within the same region.

In step S802*a*, the mobile device 2 analyzes the signal received (e.g., the mobile device converts the pattern of frequencies into a series of 1's and 0's).

In step S802*b*, the position information obtaining module 30 of mobile device 2 obtains the position information of location base station 1 after analyzing the signal that was sent in step 801.

In step S803*a*, the mobile device 2 sends the location information back to the location base station 1. Optionally, in step S803*b*, if the information sent in step 803*a* is authenticated, mobile device 2 receives service information, which may include promotion information or other information.

In an embodiment, each of the steps of the method FIG. 8A is a distinct step. In another embodiment, although depicted as distinct steps in FIG. 8A, step S801-S803*b* may not be distinct steps. In other embodiments, the method FIG. 8A may not have all of the above steps and/or may have other steps in addition to or instead of those listed above. The steps of method the method FIG. 8A may be performed in another order. Subsets of the steps listed above as part of method the method FIG. 8A may be used to form their own method.

With respect to FIG. 8B, in an embodiment, system 100 implements a method of location authentication. The method comprises the following steps.

In step S851, the location base station 1 sends the signal marking the position of location base station 1, which may be sent by the first signal transmitting-receiving module 10 of location base station 1 within the same region.

In step S852, the location base station 1 receives a signal from the mobile device 2 indicating the location of the mobile device 2. The information received from mobile device 2 may be the same as, included in, and/or derived from the information sent to mobile device 2 in step S851.

In step S853, the location base station 1 sends the position information received to the location authentication server 3 to obtain the location authentication of the mobile device 2 being in the same region as the location base station 1.

In optional step S854, the location base station 1 sends service information to the mobile device 2.

In an embodiment, each of the steps of the method FIG. 8B is a distinct step. In another embodiment, although depicted as distinct steps in FIG. 8B, step S851-S854 may not be distinct steps. In other embodiments, the method FIG. 8B may not have all of the above steps and/or may have other steps in addition to or instead of those listed above. The steps of method the method FIG. 8B may be performed in another order. Subsets of the steps listed above as part of method the method FIG. 8B may be used to form their own method.

In an embodiment, the signal marking the position of location base station 1 (sent by the first signal transmitting-receiving module 10 of location base station 1) is a non-audible sound signal. The same region is the effective region of the signals sent by the location base station. The region marked by the signal of the location base station is a region that is indoors or a region near building-intensive outdoor environments. In an embodiment, the region marked by the signal of the location base station is a suite or a room indoors. For example, the region marked by the signal of the location base station may be inside of a commercial building or an office in the building. The areas near the building-intensive environment could be the areas between many buildings, the front door of a building with a higher ceiling, such as a building that is more than 30 stories, or the area between several high buildings.

In an embodiment, steps after S853 also include the following.

The mobile device 2 obtains the service information provided by the service information module 50 of mobile device 2 (see steps S803b and S854).

Specifically, the recording sub-module 51 of location base station 1 records the information of mobile device 2 that is in the same region as location base station 1. Alternatively, the transmitting sub-module 52 of mobile device 2 sends the promotion information to the mobile device 2. As another alternative, the transmitting sub-module 52 of mobile device 2 sends the security information (of the region marked by the signal of the location base station) to the mobile device 2.

In an embodiment, the first signal transmitting-receiving module 10 sends the non-audible sound signal by the predefined first frequency. Alternatively, the first signal transmitting-receiving module 10 sends the non-audible sound signals by the first set of frequencies corresponding to the predefined first set of multi-bit information. As another alternative, the first signal transmitting-receiving module 10 sends the non-audible sound signal (sent in the alternating fashion). The non-audible sound signal corresponds to the second set of multi-bit information, or the first signal transmitting-receiving module 10 sends the non-audible sound signal by the third set of frequencies corresponding to the third set of multi-bit information, generated randomly. The first controlling sub-module 11 of first signal transmitting-receiving module 10 controls the first audible frequency generating-transmitting sub-module 12 to generate and send these frequencies or frequency sets.

In an embodiment, the first frequency corresponds to the predefined first set of first position coding. The first position coding marks and/or includes the position information within the same region as the location base station 1. The first set of multi-bit information corresponds to the predefined second position coding. The second position coding marks and/or includes the position information within the same region as the location base station 1. The second set of multi-bit information corresponds to the predefined third position coding. The third position coding marks and/or includes the position information within the same region as the base station 1. The third set of multi-bit information corresponds to the predefined fourth position coding. The fourth position coding marks and/or includes the position information within the same region as the location base station 1. The first signal could be the non-audible sound signal of a fixed first frequency, first set of frequencies, or not correspond to the specific position coding but use the first frequency or multi-bit information to determine the specified position information directly, such as 20000 Hz is used to represent room 10 etc.

The non-audible sound signal includes at least the ultrasound signal and low frequency signal. In particular, the non-audible sound signal comprises the ultrasound signal and/or low frequency signal. In general, the ultrasound signal is above 20000 Hz, the low frequency signal is 16 Hz-25 Hz. Using a low frequency signal, not only provides the position of the mobile terminal (or mobile device), but also causes no bad effects to the environment, in contrast to the radiation of a GPS signal, and consequently is the low frequency signal is beneficial to health.

In one of the embodiments of this invention, the first position coding, the first set of multi-bit information, the second set of multi-bit information, and the third set of multi-bit information correspond to one unit of position information in the predefined query table of position information, respectively.

In step 802b, the decoding sub-module 31 of mobile device 2 obtains the position information of the location base station 1. The position information is obtained by decoding the first set of frequencies, the non-audible sound signal sent in an alternating fashion (alternating between sending a signal and not sending a signal) by sending the predefined second set of frequencies for a predetermined period of time, then not sending a signal for a predetermined period of time and then sending a third set of frequencies for a predetermined period of time (the predetermined periods of time may have same or different lengths), obtaining the first set of multi-bit information, the second set of multi-bit information and the third set of multi-bit information by the third frequency, and querying the position information corresponding to the first position coding, the second position coding, the third position coding, the fourth position coding in the query table of position information by the query sub-module 32 (of mobile device 2), respectively. The query table of the position information is stored in the mobile device 2, the location base station 1, or the storing module 60 of location authentication server 3.

In an embodiment, the third set of multi-bit information generated randomly is generated by the server 4 of location base station 2 or the random number generating module 70 of location base station 1. After the random number generating module 70 of server 4 generates the third set of multi-bit information, the random number transmitting module 80 of server 4 transmits the third set of multi-bit information to the location base station 1. The server 4 sends the third set of multi-bit information centrally. So, there are several location base stations 1, several pieces of third set of multi-bit information, the pieces of third set of multi-bit information correspond to several location base stations 1, respectively. To further ensure the accuracy of location authentication, the pieces of third set of multi-bit information being spaced by the predefined third time interval.

In one of the embodiments, in step S853, the location authentication server 3 is part of (e.g., installed within) the location base station 1, the position message validation module 40 of location base station 1 verifies whether the mobile device 2 is in the same region as the location base station 1 by the position information of mobile device 2.

Alternatively, the location authentication server 3 is one of the servers 4 of the location base station 1. The position message validation module 40 of server 4 verifies whether the mobile device 2 is in the same region as the location base station 1, via the position information sent by the location base station and the position information of location base station 1.

In one of the embodiments of this invention, the location authentication server 3 comprises several servers 4 of the location base stations 1; the servers 4 comprise at least one main server 4 and at least one synchronization server 4; the synchronization module 90 of synchronization server 4 would sync the position information of location base station 1 with the synchronization module 90 of main server 4 according to the predefined second time interval. Ensuring the consistency of the data could prevent damages happen. The server 4 could be the server of mobile communication network, the mobile device 2 is a mobile terminal.

In an embodiment, there are several location base stations 1 within the same region.

The step S801 and S851 may include the first signal transmitting-receiving modules 10 of location base stations 1 send the signals marking the position information of location base station 1, respectively.

The mobile device 2 receives the signals sent by the first signal transmitting-receiving modules 10 of location base stations 1 that the signals are above or equal to the predefined strength standard. In particular, the predefined strength standard is double the mean signal strength or above of signals received by the mobile device in the predefined period.

In the steps of the mobile device 2 receiving the signals sent by the location base station 1 that the signals are above or equal to the strength standard according to the predefined signal strength. The mobile device 2 receives the first signal meeting the predefined signal strength.

Alternatively, with the signals sent by the location base stations 1 being less than the predefined strength standard, the mobile device 2 receives the first transmitted signal sent by the location base stations 1. Thus, the system suits different reception environments and situations.

Specifically, the signal processing module 110 filters the signals sent by the first signal transmitting-receiving modules 10 of location base stations 1 (which are below the strength standard). The strength standard setting module 120 calculates the mean signal strength of the received signals in a predefined period, and sets the predefined signal strength according to the mean strength.

The signals marking the position information of location base stations 1, respectively, sent by several location base stations 1 may be the same frequency or different frequencies.

In an embodiment, each location base station 1 could use the same frequency or different signal frequencies to prevent the interference from the signals sent by nearby mobile devices 2. For example, when the non-audible sound signal is an ultrasound signal, frequency of the non-audible signal is 20000 Hz-22000 Hz and could be divided in 4 bands, such as 20000 Hz-20500 Hz, 20500 Hz-21000 Hz, 21000 Hz-21500 Hz, and 21500 Hz-22000 Hz. When installing the location base station 1, the location base station 1 adjusts itself by using different frequency bands than other neighboring location base stations 1.

Also, due to the influences of sound absorption and reflection of non-audible frequency, the farther from the ground, the weaker the signal strength is in general. The signal strength may be used to estimate the distance between a mobile device and a location base station. As the wall penetration ability of non-audible frequencies is weak, the signal sent by location base station 1 in a compartment or room indoors is not be transmitted to the mobile device 2. If the non-audible frequency does not refract, as there is no sound wave reflection object outdoors, the speakers' design of location base station 1 defines the direction of the non-audible sound signal sent by location base station 1. The mentioned conditions reduce the opportunities of mobile device 2 receiving more than one piece of information sent by the location base station 1, which makes it more difficult to determine which regions should the location base station 1 receive the effective position information by installing the position of location base station 1.

To sum up, the location base station is installed in several specific regions indoors and/or near the building-intensive outdoor environments, such as in a suite, in a room, or in several areas between many buildings. The location base station sends signals according to the predefined frequency or one set of frequencies. After the mobile device that is in the same region with the location base station receives the signal, the mobile device obtains the position information of location base station and sends the position information to the location authentication server to obtain the location authentication of being in the same region as the location base station. Furthermore, the mobile device 2 obtains the service provided by the location base station that is within the same region as the mobile device 2. The position information of location base stations each have corresponding multi-bit information codes. The corresponding multi-bit information controls the location base station, causing the location base station to send related frequency signals. The security code enhances the security and accuracy of location authentication.

Figure 9:
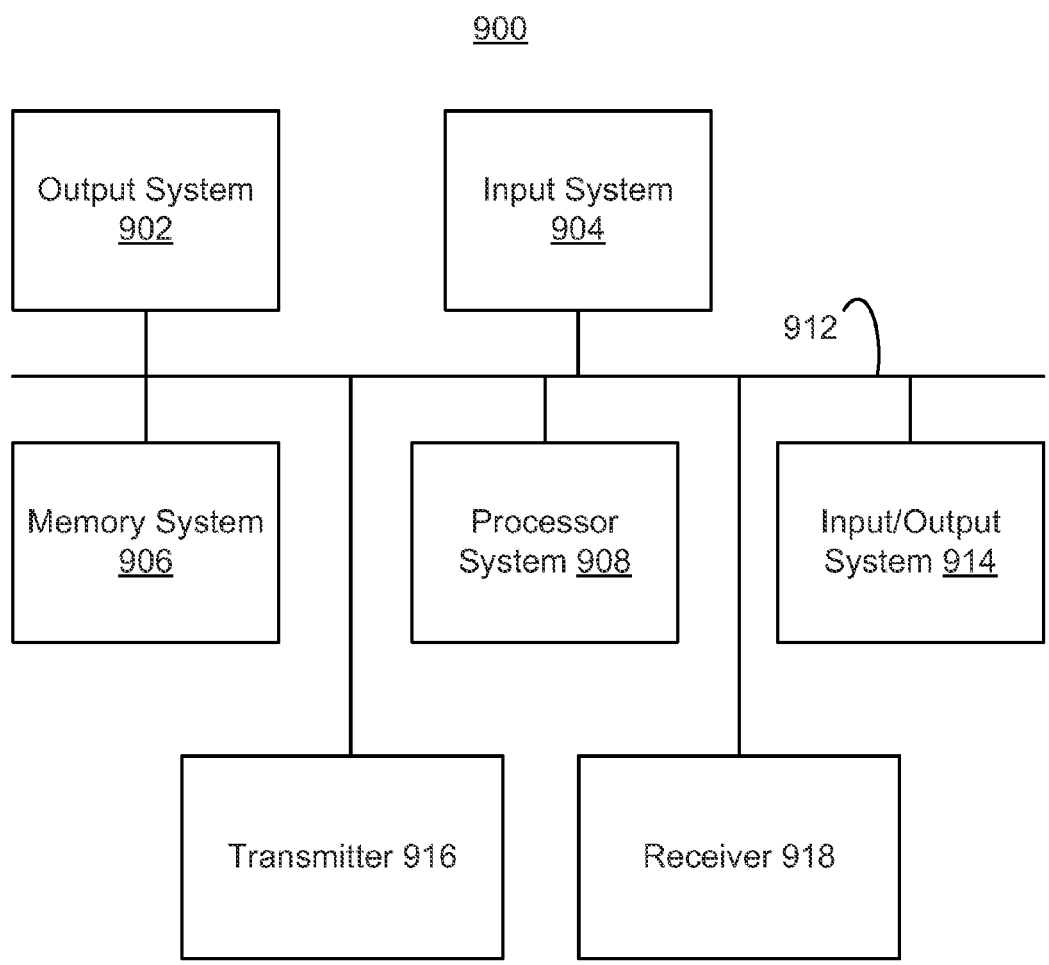
FIG. 9 is a block diagram of an embodiment of a mobile device.

FIG. 9 shows a block diagram of a mobile device 900 used in system 100. The mobile device 900 may include output system 902, input system 904, memory system 906, processor system 908, communications system 912, input/output device 914, transmitter 916, and optional receiver 918. In other embodiments mobile device 900 may not have all of the elements or features listed and/or may have other elements or features instead of or in addition to those listed.

Mobile device 900 is an example of mobile device 2 (however, mobile device 2 may have other embodiments).

Output system 902 may include any one of, some of, any combination of, or all of a display system, a speaker system, a connection or interface system to a sound system, an interface system to peripheral devices and/or a connection and/or interface system to a computer system, intranet, and/or internet, for example.

Input system 904 may include any one of, some of, any combination of, or all of a keyboard system, a keypad system, a track ball system, a track pad system, buttons on a handheld system, a scanner system, a microphone system, a camera, a connection to a sound system, and/or a connection and/or interface system to a computer system, intranet, and/or internet (e.g., IrDA, USB), for example.

Memory system 906 may include, for example, any one of, some of, any combination of, or all of a long term storage system, such as a hard drive; a short term storage system, such as random access memory; a removable storage system, such as a floppy drive or a removable drive; and/or flash memory. Memory system 906 may include one or more machine readable mediums that may store a variety of different types of information. The term machine-readable medium is used to refer to any non-transitory medium capable carrying information that is readable by a machine. One example of a machine-readable medium is a computer-readable medium. Another example of a machine-readable medium is paper having holes that are detected that trigger different mechanical, electrical, and/or logic responses.

Memory 906 may also store machine instructions for implementing the methods of FIG. 8A and/or store software versions of the various modules of receiving end 2.

Processor system 908 may include any one of, some of, any combination of, or all of multiple parallel processors, a single processor, a system of processors having one or more central processors and/or one or more specialized processors dedicated to specific tasks. Also, processor system 908 may include one or more Digital Signal Processors (DSPs) in addition to or in place of one or more Central Processing Units (CPUs) and/or may have one or more digital signal processing programs that run on one or more CPU.

Communications system 912 communicatively links output system 902, input system 904, memory system 906, processor system 908, and/or input/output system 914 to each other. Communications system 912 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Input/output system 914 may include devices that have the dual function as input and output devices. For example, input/output system 914 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 914 is optional, and may be used in addition to or in place of output system 902 and/or input device 904.

Transmitter 916 transmits non-audible sound signals. Transmitter 916 may be a speaker that is tuned to produce frequencies of 16-25 Hz and/or 17000 Hz to 22,000 Hz (the speaker may be driven by a signal generator). In an embodiment transmitter 916 is an ultrasound transmitter. Optional receiver 918 may be a microphone designed for picking up sound having a frequency of 16-25 Hz and/or 17000 Hz to 22,000 Hz. In an embodiment, receiver 918 is an ultrasound receiver.

Figure 10:
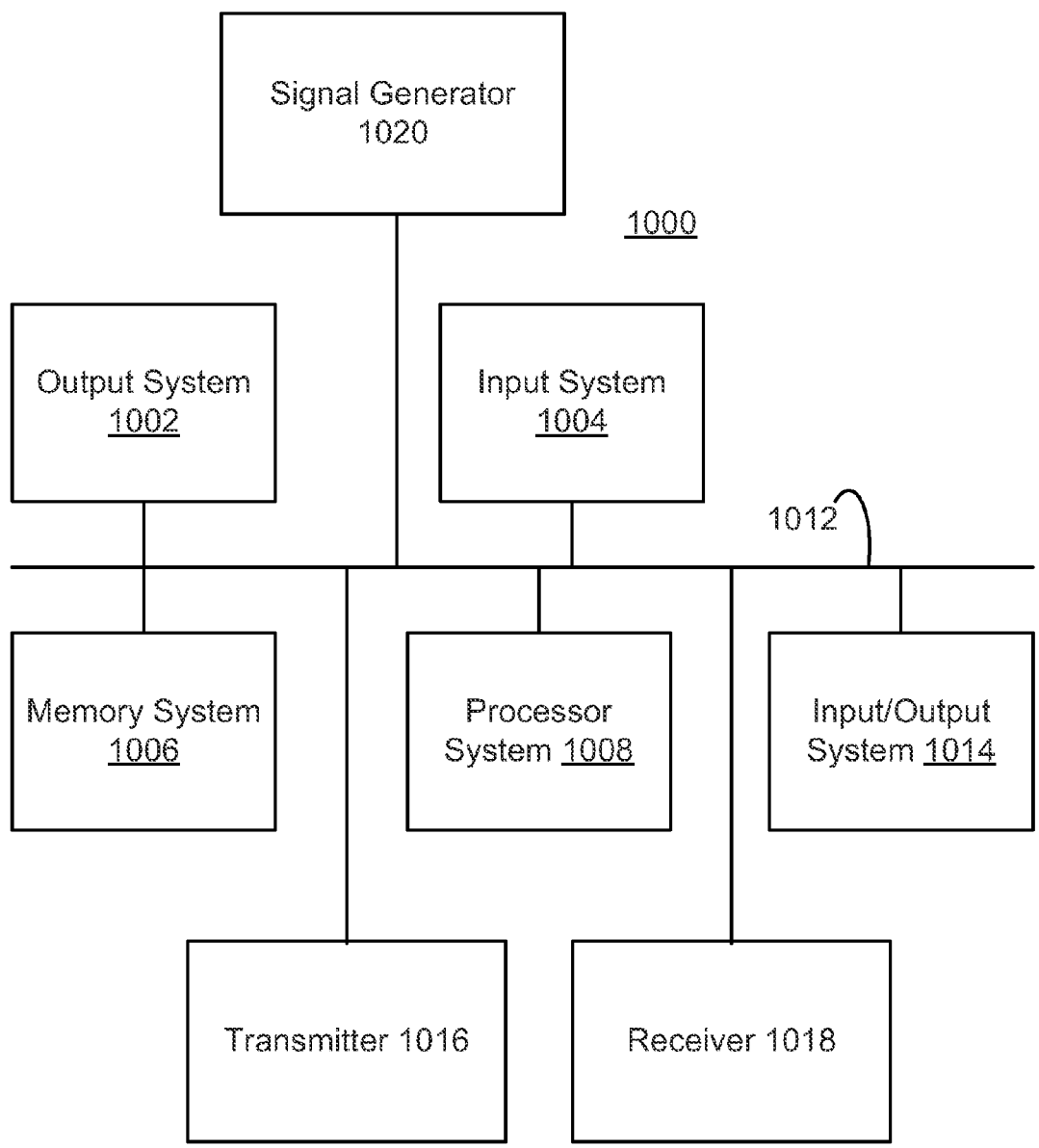
FIG. 10 is a block diagram of an embodiment of a location base station.

FIG. 10 shows a block diagram of a base station 1000 used in system 100. The base station 1000 may include output system 1002, input system 1004, memory system 1006, processor system 1008, communications system 1012, input/output device 1014, optional transmitter 1016, receiver 1018, and signal generator 1020. In other embodiments base station 1000 may not have all of the elements or features listed and/or may have other elements or features instead of or in addition to those listed.

Base station 1000 is an example of a location base station 1. Output system 1002, input system 1004, memory system 1006, processor system 1008, communications system 1012, input/output device 1014, transmitter 916, and receiver 918 have essentially the same description as output system 902, input system 904, memory system 906, processor system 908, communications system 912, input/output device 914, and transmitter 916, receiver 918. Optional signal generator 1020 may generate an electrical frequency of an appropriate frequency for simulating the transmitter 916 to produce the desired frequency (although not shown, mobile device 900 may also have a signal generator). Output system 1002, input system 1004, input/output system 1014 may differ from output system 902, input system 904, and input/output system 914 in that mobile device 900 may have many or all of the input/output features that a smart phone (or other mobile device) has, whereas the input output features of location base 1000 may be more limited to setting the parameters of operation of location base station 1000 and interacting with mobile device 900, for example (however, location base stations 1 may have other embodiments).

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

There could be numerous embodiments of the method, system and device of location authentication in accordance with this invention. It is understood that the technicians of related fields could make related changes and modifications in accordance with this invention but within the spirit and scope of this invention. Thus, the related changes and modifications are to be limited only by the claims as set forth below.

What is claimed is:

1. A method of location authentication comprising:
   sending to a mobile device a first signal marking a position of a location base station, the first signal being sent by the location base station within a region where the mobile device and location base station are located, the signal including at least a first identifier identifying the region, a security code, and a second identifier identifying the location base station;
   the location base station receiving a second signal from the mobile device, the second signal including at least the first identifier, the security code, and the second identifier, and the signal indicating the location of the mobile device; and
   in response to receiving the second signal from the mobile device, the location base station inputting information about the location of the mobile device into a location authentication server for location authentication, and the location base station obtaining, from the location authentication server, results of the location authentication of the region with the location base station.

2. A method of location authentication as set forth in claim 1, further comprising:
   after the location base station obtains location authentication of the region having the location base station, sending from the location base station to the mobile device service information.

3. A method of location authentication as set forth in claim 1, wherein the signals sent by the location base station marking the position of the location base station are non-audible sound signals;
   the region where the location base stations and mobile device are located is a region within a range that the magnitude of the signal sent by the location base station is above a predefined threshold, the region having a background signal that has background signal strength, which has a mean value, and the threshold being twice the mean value of the background signal strength.

4. A method of location authentication as set forth in claim 3, wherein the region is indoors or the region is outdoors in an area adjacent to one or more buildings where GPS signals are not reliable.

5. A method of location authentication as set forth in claim 4, wherein the step of the sending to the mobile device the signal marking the position of the location base station, further comprising:
the location base station determining a set of multiple bits of information and sending the non-audible sound signals, the non-audible sound signals including a set of frequencies, where each frequency of the set of frequencies represents a different set of multiple bits of information.

6. A method of location authentication as set forth in claim 4, wherein the step of the sending to the mobile device the signal marking the position of the location base station, further comprising:
determining at the location base station multiple bits of information;
sending the non-audible sound signals, the non-audible signal including at least a first segment having a first frequency and a second segment having a second frequency, the second segment and the first segment being spaced by a time interval, the first segment of the non-audible sound signals representing the multiple bits of information, and the second segment of the non-audible sound signals representing the multiple bits of information.

7. A method of location authentication as set forth in claim 4, the step of the sending to the mobile device the signal marking the position of the location base station, further comprising:
randomly generating multiple bits of information, and sending the non-audible sound signals, the non-audible signals being a set of frequencies representing the randomly generated multiple bits of information;
the region is a suite or a room indoors and/or several outdoor areas between multiple buildings.

8. A method of location authentication as set forth in claim 7, the multiple bits of information including position information including at least latitude, longitude, and altitude of the position of the location base station.

9. A method of location authentication comprising:
sending to a mobile device a first signal marking a position of a location base station, the first signal being sent by the location base station within a region where the mobile device and location base station are located;
the location base station receiving a second signal from the mobile device, the second signal including the location of the mobile device; and
in response to receiving the second signal from the mobile device, the location base station inputting information about the location of the mobile device into a location authentication server for location authentication, and the location base station obtaining, from the location authentication server, results of location authentication of the region with the location base station;
wherein the region is indoors or the region is outdoors in an area adjacent to one or more buildings, wherein the signals sent by the location base station marking the position of the location base station are non-audible sound signals, the sending of the non-audible signal including at least sending from one location base station
a first position coding including a first set of multiple bits of information,
a second position coding including a second set of multiple bits of information,
a third position coding including a third set of multiple bits of information, and
a security code including a fourth set of multiple bits of information;
decoding, by the mobile device, the non-audible signal to obtain the first set of multi bits of information, the second set of multi bits of information, the third set of multi bits of information, and the fourth set of multiple bits of information;
collectively, the first position coding, the second position coding, the third position, and the security code being associated within a query table with one location base station as different parameters; and
the receiving of the second signal at the location base station from the mobile device including receiving the first set of multi bits of information, the second set of multi bits of information, the third set of multi bits of information, and the fourth set of multiple bits of information from the mobile device.

10. A method of location authentication as set forth in claim 4, the non-audible signal includes one or more frequencies in a range of frequency of 17000 Hz-22000 Hz or 16 Hz-25 Hz.

11. A method of location authentication as set forth in claim 1, the location base station including the authentication server.

12. A method of location authentication, comprising:
sending to a mobile device a first signal marking a position of a location base station, the first signal being sent by the location base station within a region where the mobile device and location base station are located, the first signal including a first randomly generated identifier identifying the region and a second identifier identifying the location base station;
the location base station receiving a second signal from the mobile device indicating the location of the mobile device, the second signal including the first randomly generated identifier identifying the region and the second identifier identifying the location base station; and
in response to receiving the signal from the mobile device, the location base station inputting information about the position into a location authentication server to obtain results of location authentication of the region with the location base station, based on the signal sent by the mobile device;
wherein the location authentication server comprises several servers installed in several location base stations; the servers comprise at least one main server and at least one synchronization server; the synchronization server synchronizing a query table of position information with the main server.

13. A method of location authentication as set forth in claim 12, wherein the location authentication server randomly generates multiple bits of information;
after the server randomly generates the multiple bits of information, the server location authentication server outputs the randomly generated multiple bits of information to the location base station.

14. A method of location authentication as set forth in claim 13, wherein there are several location base stations, several sets of randomly generated multiple bits of information, each of the sets of randomly generated multiple bits of information corresponds to a different one of the location base stations.

15. A method of location authentication as set forth in claim 1, further comprising:
sending service information provided by the location base station to the mobile device, and the location base station recording information received from the mobile device.

16. A method of location authentication as set forth in claim 1, further comprising:
sending service information provided by the location base station to the mobile device, the service information including promotional information.

17. A method of location authentication as set forth in claim 1, further comprising:
after the location base station obtains location authentication that verifies that the mobile device is in the same region as the location base station, sending service information provided by the location base station to the mobile device, the service information including security information for accessing the region where the location base station is located;
receiving a message from the mobile device via wireless communication;
determining, by the location authentication server, whether to grant access to the region based on whether the message includes a value associated with the security information that matches the security information sent.

18. A method of location authentication as set forth in claim 1, wherein there are several location base stations at different positions within one region;
the sending to the mobile device of the signal marking the position of the location base station, further comprises:
the several location base stations sending signals, each location base station sending a signal including at least latitude, longitude, and altitude of a position where the location base station is located.

19. A system of location authentication, wherein the system comprises:
a location base station having at least
a signal transmitting-receiving module, that sends a first signal marking the position of the location base station to a mobile device within a region where the location base station is located, the first signal including a first identifier identifying the region and a second identifier identifying the location base station, the first signal having a signal strength that is double a mean value of a strength of signals measured over a predetermined period of time; and
a location authentication server, the location authentication server of the base station receiving a second signal having the first identifier identifying the region and the second identifier identifying the location base station originating from the mobile device, the location authentication server having at least a position message validation module that authenticates the position of the mobile device by determining whether the location base station is in the same region as the mobile device, based on the second signal.

20. A system of location authentication as set forth in claim 19, the location base station further comprising:
a service information module that provides service information to the mobile device after the position message validation module verifies that the mobile device is in the same region as the location base station.

21. A system of location authentication as set forth in claim 19, wherein the signal marking the position of the location base station sent by the location base station is a non-audible sound signal; and
the location base stations and the mobile device are considered to be in the same region if the mobile device is within a signal range of the location base station.

22. A system of location authentication as set forth in claim 19, wherein the region is indoors or outdoors adjacent one or more buildings; and
the location base station is installed in the region in a fixed location.

23. A system of location authentication as set forth in claim 19, wherein the signal transmitting-receiving module comprises:
a control sub-module that controls an audible frequency generating-transmitting sub-module to generate a particular frequency.

24. A system of location authentication as set forth in claim 19, wherein the signal transmitting-receiving module comprises:
a control sub-module that correlates a set of multiple bits of information to a set of frequencies.

25. A system of location authentication, wherein the system comprises:
a location base station having at least
a signal transmitting-receiving module, that sends a signal marking the position of the location base station to a mobile device within a region where the location base station is located, the signal being a non-audible sound signal that includes a first identifier identifying the region, a security code, and a second identifier identifying the location base station; and
a location authentication server having at least a position message validation module that, in response to receiving the first identifier identifying the region, the security code, and the second identifier identifying the location base station originating from the mobile device, authenticates the position by determining whether the location base station is in the same region as the mobile device, the position information obtaining module comprises:
a query sub-module that queries position information corresponding to a first position coding, a second position coding, a third position coding and the security code to obtain the position information of the location base station wherein the first position coding, the second position coding, the third position coding and the security code correspond to one location base station in a default query table of position information respectively.

26. A system of location authentication as set forth in claim 19, the system further comprising a storage module that stores a query table of position information including at least latitude, longitude, and altitude of the position of the location base station;
the signal marking the position of the location base station being a non-audible signal includes one or more frequencies in a range of frequency of 17000 Hz-22000 Hz, 16 Hz-25 Hz, or 17000 Hz-22000 Hz and 16 Hz-25 Hz.

27. A system of location authentication as set forth in claim 19, wherein the system further comprises several synchronization modules that are installed in several servers of several location base stations, respectively; the several servers include at least one main server and at least one synchronization server; a given synchronization module of a given synchronization server synchronizes a query table with the synchronization module of a main server, the query table stores information correlating position information with time intervals.

28. A system of location authentication as set forth in claim 27, wherein the system also comprises:
   a server installed in the location base station;
   a random number generating module, which is installed in the server, the random number generating module generates a set of multiple bits of random information.

29. A system of location authentication as set forth in claim 28, wherein the random number generating module generates several sets of multiple bits of information, the several sets of multiple bits of information correspond to several location base stations, which are each located at one site, respectively.

30. A system of location authentication as set forth in claim 29, further comprising: sending a message having each of the several sets of multiple bits of information temporally spaced from one another by time intervals.

31. A system of location authentication as set forth in claim 19, the location base station including at least
   a service information module that provides service information to the mobile device after the position message validation module verifies that the mobile device is in the same region with the location base station;
   wherein the service information module includes at least
   a recording sub-module, for recording information about the mobile device within the same region as the location base station, and
   a transmitting sub-module that sends promotion information to the mobile device.

32. A system of location authentication as set forth in claim 19, wherein the system comprises several mobile devices and several location base stations, the location base stations are each installed in different regions, respectively.

33. A system of location authentication as set forth in claim 19, wherein the first signal transmitting-receiving module comprises:
   a control sub-module that correlates a non-audible sound signal that includes a first frequency and a second frequency temporally spaced by a time interval, to a first set of multiple bits of information that corresponds to the first frequency and a second set of multiple bits of information that corresponds to the second frequency.

34. A system of location authentication as set forth in claim 19, wherein the first signal transmitting-receiving module comprises:
   a control sub-module that correlates a set of frequencies to a randomly generated set of multiple bits of information.

35. A system of location authentication as set forth in claim 19, wherein first signal transmitting-receiving module comprises:
   a control sub-module; and
   a frequency generating-transmitting sub-module controlled by the control sub-module, that generates and sends a non-audible sound signal at a particular frequency.

36. A system of location authentication as set forth in claim 19, the location base station including at least
   a service information module that provides service information to the mobile device after the position message validation module verifies that the mobile device is in the same region with the location base station;
   wherein the service information module includes at least
   a recording sub-module, for recording information about the mobile device within the same region as the location base station, and
   a transmitting sub-module that sends security information to the mobile device for accessing the region where the location base station is located.

37. A system of location authentication as set forth in claim 19, the signal marking the position of the location base station being a non-audible signal includes one or more frequencies in a range of frequency of 16 Hz-25 Hz.

38. A method of location authentication comprising:
   sending to a mobile device a first signal marking a position of a location base station, the first signal being sent by the location base station within a region where the mobile device and location base station are located, the first signal including an identifier of the location base stations, the first signal being a non-audible sound signal that includes
   a first position coding including a first set of multiple bits of information,
   a second position coding including a second set of multiple bits of information,
   a third position coding including a third set of multiple bits of information, and
   a security code including a fourth set of multiple bits of information,
   collectively, the first position coding, the second position coding, the third position, and the security code being associated with one location base station, wherein the non-audible sound signal includes a set of frequencies, each frequency of the set of frequencies representing a different set of multiple bits of information;
   decoding, by the mobile device, the non-audible sound signals to obtain the first set of multi bits of information, the second set of multi bits of information, the third set of multi bits of information, and the fourth set of multiple bits of information;
   receiving, at the location base station from the mobile device, a second signal indicating the location of the mobile device, the second signal including an identifier of the location base stations, the second signal including at least the first set of multi bits of information, the second set of multi bits of information, the third set of multi bits of information, and the fourth set of multiple bits of information; and
   in response to receiving the second signal from the mobile device, the location base station inputting at least the first set of multi bits of information, the second set of multi bits of information, the third set of multi bits of information, and the fourth set of multiple bits of information into a location authentication server;
   authenticating, by the location authentication server, the location of the mobile device based on the first set of multi bits of information, the second set of multi bits of information, the third set of multi bits of information, and the fourth set of multiple bits of information received from the location base station, the location authentication server searching for a match of the first set of multi bits of information, the second set of multi bits of information, the third set of multi bits of information, and the fourth set of multiple bits of information in a query table stored in the location authentication server, whereas the authentication is verified if the first position coding, the second position coding, the third position, and the security code is associated within the query table with one location base station in the query table;

receiving, at the location base station from the location authentication server, results of location authentication of the region with the location base station;

sending service information from the location base station to the mobile device after the location authentication is verified.

39. A method of location authentication comprising:

sending to a mobile device a first signal marking a position of a location base station, the first signal being sent by the location base station within a region where the mobile device and location base station are located, the first signal including at least a first identifier identifying the region, a second identifier identifying the location base station, and a security code;

the location base station receiving a second signal from the mobile device, the second signal including the first identifier, the second identifier, and the security code, and the second signal indicating the location of the mobile device; and in response to receiving the signal from the mobile device, the location base station inputting information about the location of the mobile device into a location authentication server to obtain results of location authentication of the region with the location base station, based on the signal received from the mobile device.

* * * * *